US008731296B2

(12) United States Patent
Xiao

(10) Patent No.: US 8,731,296 B2
(45) Date of Patent: May 20, 2014

(54) CONTACT TEXT DETECTION IN SCANNED IMAGES

(75) Inventor: Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 436 days.

(21) Appl. No.: 13/091,549

(22) Filed: Apr. 21, 2011

(65) Prior Publication Data

US 2012/0269435 A1 Oct. 25, 2012

(51) Int. Cl.
*G06K 9/34* (2006.01)

(52) U.S. Cl.
USPC ............ 382/176; 382/175; 382/100; 382/101

(58) Field of Classification Search
USPC ......... 382/172, 176, 180, 218, 173–174, 204, 382/197, 517, 101, 190, 100; 707/6, 4
See application file for complete search history.

(56) References Cited

U.S. PATENT DOCUMENTS

| | | | |
|---|---|---|---|
| 5,212,741 A | 5/1993 | Barski et al. | |
| 5,410,611 A * | 4/1995 | Huttenlocher et al. | 382/177 |
| 5,680,478 A * | 10/1997 | Wang et al. | 382/176 |
| 5,818,978 A * | 10/1998 | Al-Hussein | 382/296 |
| 5,892,843 A * | 4/1999 | Zhou et al. | 382/176 |
| 6,006,226 A * | 12/1999 | Cullen et al. | 382/232 |
| 6,023,534 A | 2/2000 | Handley | |
| 6,038,527 A | 3/2000 | Renz | |
| 6,173,073 B1 * | 1/2001 | Wang | 382/176 |
| 6,266,156 B1 * | 7/2001 | Tanimura et al. | 358/1.9 |
| 6,298,173 B1 * | 10/2001 | Lopresti | 382/305 |
| 6,683,967 B1 * | 1/2004 | Takahashi | 382/101 |
| 6,909,805 B2 | 6/2005 | Ma et al. | |
| 6,996,295 B2 | 2/2006 | Tyan et al. | |
| 7,120,318 B2 | 10/2006 | Tyan et al. | |
| 7,557,963 B2 | 7/2009 | Bhattacharjya | |
| 7,873,215 B2 * | 1/2011 | Xiao et al. | 382/173 |
| 8,411,957 B2 * | 4/2013 | Furuhata | 382/182 |
| 8,611,662 B2 * | 12/2013 | Tsai et al. | 382/176 |
| 2009/0003700 A1 * | 1/2009 | Xiao et al. | 382/176 |
| 2009/0148042 A1 * | 6/2009 | Fan et al. | 382/176 |
| 2010/0299332 A1 * | 11/2010 | Dassas et al. | 707/741 |
| 2011/0280452 A1 * | 11/2011 | Furuhata | 382/112 |
| 2012/0250985 A1 * | 10/2012 | Xiao | 382/164 |
| 2013/0129216 A1 * | 5/2013 | Tsai et al. | 382/170 |

OTHER PUBLICATIONS

Satadal et al., A Hough Transform based Technique for Text Segmentation, Journal of Computing, vol. 2, Issue 2, Feb. 2010, pp. 134-141.*

Keechul Jung, JungHyun Han "Hybrid approach to efficient text extraction in complex color images" Pattern Recognition Letters 25 (2004), p. 679-699.*

Keechul Jung, Kwang In Kim, Anil K. Jain "Text information extraction in images and video: a survey" Pattern Recognition 37 (2004), p. 977-997.*

* cited by examiner

*Primary Examiner* — Mekonen Bekele

(57) ABSTRACT

A device and method for identifying text pixels that are erroneously classified as non-text pixels, includes accessing an image region containing a non-text component. For each non-text component within the image region component, only one determines if there are any long line structures within the bounding box defined by the non-text component. If the long line structures are greater than a predefined percentage of the span of the dimension of the bounding box parallel to the line structure, then the line structure is removed. Any remaining non-text pixels within the bounding box are reclassified as text-pixels.

16 Claims, 24 Drawing Sheets

| 原稿読み取りセンサ | 3ラインカラーCCDラインセンサ |
| --- | --- |
| 原稿読み取り方式 | |
| 複写方式 | 半導体レーザービーム走査+乾式… |
| 接続インターフェイス | Ethernet (100Base-TX)… |
| 対応プロトコル※2 | TCP/IP, IPX/SPX, AppleTalk… |
| 画像解像度 | 600dpi/300dpi |
| 複写原稿 | シート、ブック |
| | 普通紙、上質普通紙、専用紙… |

FIG. 2A

| ネットワーク使用環境 | ネットワークプリント使用時※1 | | | ネットワークTWAIN | ネットワークスキャナ使用時 サーバスキャン※2 | | |
|---|---|---|---|---|---|---|---|
| 対応プロトコル | TCP/IP<br>IPX/SPX (NetWare)※3<br>AppleTalk※3 | | | TCP/IP | TCP/IP<br>IPX (NetWare)※3 | | |
| | 〈サーバ〉 | 〈クライアント〉 | | | 〈サーバ〉 | 〈クライアント〉 | |
| 対応OS | WindowsNT4.0/3.51 Server<br>NetWare5J※6<br>NetWare4.1xJ<br>NetWare3.2J<br>NetWare3.12J<br>IntranetWare | Windows98/95※4<br>WindowsNT4.0/3.51 Workstation<br>漢字Talk7.5X以上 | | Windows98/95<br>WindowsNT4.0/3.51 Workstation<br>Mac OS7.6.1以上※7 PowerPC | WindowsNT4.0/3.51 Server※5<br>NetWare5J※6<br>NetWare4.1xJ<br>NetWare3.2J<br>NetWare3.12J<br>IntranetWare | Windows98/95<br>WindowsNT4.0/3.51 Workstation | |

| | ビジネスカラーコピーシステム<br>LP-8200C※1+ES-6000+CS-6000N | フォトカラーコピーシステム<br>PM-5000C+ES-8000+CS-5000N |
|---|---|---|
| 形式 | ネットワーク固定式 | |
| 原稿台方式 | 原稿固定式/ADF(オプション装着時) | |
| 原稿読み取り方式 | 3ラインカラーCCDラインセンサ読み取り | |
| 複写方式 | 半導体レーザービーム走査と乾式二成分トナー電子写真方式 | フォトインクジェット方式 |
| 接続インターフェイス | Ethernet(100Base-TX/10Base-T) (スキャナ・プリンタ) | |
| 対応プロトコル※2 | TCP/IP, IPX/SPX, AppleTalk, NetBEUI | |
| 画像解像度 | 600dpi/3bpd | 720dpi/3bpd |
| 複写原稿 | シート・ブック | シート・フィルム※3 |

FIG. 9B

| 重量 | 約10kg (CS-6000Nのみ)<br>約10kg (CS-5000Nのみ) | |
|---|---|---|
| 添付ソフト | EPSON TWAIN Pro Network for Windows<br>EPSON TWAIN Pro Network for Macintosh<br>Microsoft Internet Explorer (Windows版→Ver.5/Macintosh版→Ver.4.5)<br>Management Console<br>Presto Page Manager Network Edition for EPSON (Windows版, 3ユーザー版※12)<br>Presto Page Manager for EPSON (Macintosh版)※11 | |
| 同梱品 | CS-6000N本体, 操作パネル, プリンターケーブル, SCSIケーブル<br>AC電源ケーブル, 取扱説明書, ソフトウェアパッケージ<br>128MBメモリ, ご愛用登録カード<br>保証書, ご愛用登録カード | CS-5000N本体, 操作パネル, 操作パネルケーブル<br>AC電源ケーブル, 取扱説明書<br>ソフトウェアパッケージ, 保証書, ご愛用登録カード |

CONTACT TEXT DETECTION IN SCANNED IMAGES

BACKGROUND

1. Field of Invention

The present invention relates to identification of text components and non-text components in an image document, such as implemented in optical character recognition applications.

2. Description of Related Art

Optical character recognition, or OCR, is a broad term applied to the general field of using machines to recognize human-readable glyphs, such as alphanumeric text characters and Chinese written characters, or more generally, Asian written characters. For each of explanation, both alphanumeric text characters and Chinese written characters are hereinafter referred to as "text" or "text character". There are many approaches to optical character recognition, such as discussed in U.S. Pat. No. 5,212,741.

However, an integral part of the field of OCR is a step to first identify, i.e., classify pixels of an image as text pixels (if they are deemed to be part of a text character) or non-text pixels (if they are not deemed to be part of a text character). Typically, a collection of text pixels may be termed a text component, and a collection of non-text pixels may be termed a non-text component. Text pixels may then be further processed to identify specific text characters, such as Western text characters or Asian writing characters.

An integral part of the pixel classification process is the identification of foreground pixels, and to limit the classification process to the foreground pixels. Typically, connected components structures (i.e., CC structure) of the foreground pixels are constructed, and the pixels defined by the CC structures are classified as candidate pixels that may then be processed for classification as text pixels or non-text pixels.

Various approaches to distinguishing text pixels from non-text pixels of an image have been proposed. For example, U.S. Pat. No. 6,038,527 suggests searching a document image for word-shape patterns.

The process of identifying text pixels is complicated when an image document being processed has a mixture of text and non-text representations. That is, if the image document includes photo pictures or line illustrations, it is possible that some of these non-text regions may be erroneously identified as text region, resulting in the misclassification of pixels. At best, this slows down the overall process since non-text pixels are erroneously processed for text identification only to be rejected as non-text. At worst, processing of the misclassified text pixels may result in the misclassified pixels being wrongly identified as true text characters, resulting in a human-discernable error in the output.

This misclassification error is exacerbated in scanned documents. Text regions are typically restricted to foreground regions of an image, and thus an initial step to pixel classification is to separate the foreground pixels from the background pixels in a scanned document. Connected component, CC operations, are then conducted on the foreground pixels to identify candidate component (i.e., candidate pixels) for classification. Unfortunately, scanned documents typically develop artifacts throughout the scanned document, including within background areas. These artifacts appear as intentional markings within a background area and thus can be mistakenly identified as foreground pixels.

This issue is particularly acute in printed documents having colorful backgrounds and patterns, where halftone textures that are part of the printing process may show up as artifacts in its scanned representation. The artifacts cause the background to not be smooth or homogeneous leading to the artifacts being erroneously identified as foreground pixels subject to CC operations. Thus, the artifacts tend to become candidate pixels, at best, or erroneously identified as text characters, at worse.

What is needed is a method of minimizing the misclassification of photo pixels, line drawing pixels, etc., as text pixels.

SUMMARY OF INVENTION

The above objects are met in a method of reclassifying non-text pixels within a document image, the method having the following steps: (a) accessing the document image, the document image having foreground pixels identified, wherein foreground pixels that have been deemed to be part of human readable printable characters are classified as text pixels and foreground pixels that have been deemed not to be part of human readable printable characters are classified as non-text pixels, and connected components of text pixels are defined as text components and connected components of non-text pixels are defined as non-text components; (b) submitting each non-text component within the document image to a candidate selection process wherein each non-text component that is deemed to potentially include text content is designated a candidate component; and (c) submitting each designated candidate component to a reclassification process wherein foreground pixels that form a specific geometric shape are removed, and the connected components defined by any remaining foreground pixels are reclassified as text components.

Preferably in step (c), the specific geometric shape is also of minimum size, the minimum size being defined relative to the dimensions of the bounding box of the candidate component being processed, and only foreground pixels that form the specific geometric shape and are not smaller than the minimum size are removed. Also preferably, the geometric shape is a straight line of foreground pixels, and the minimum size is a variable minimum size defined as a predefined percentage of the length of a corresponding side of the bounding box. In this case, straight lines of foreground pixels are identified using Hough Transforms and the predefined percentage is preferably 60%.

Also in this approach, the corresponding side of the bounding box for a given straight line of foreground pixels is determined by projecting the straight line to the side dimensions of the bounding box and the side dimension that receives the longest projection is deemed the corresponding side of the bounding box.

Additionally step (c) may include: (i) identifying as target lines any straight lines of foreground pixels within the candidate component whose length is at least the predefined percentage of the length of the corresponding side of the bounding box; (ii) removing all identified target lines; and (iii) collecting into new non-text components any remaining foreground pixels within the candidate component's bounding box; and (iv) reclassifying as text-components the new non-text components.

Preferably in step (b), the candidate selection process includes: (A) selecting for possible reclassification a current non-text component from the document image, wherein the selected current non-text component is a non-text component that has not previously been selected for possible reclassification; (B) defining a bounding box of the current non-text component; (C) IF a set of geometric properties of the bounding box is not greater than predefined minimums determined relative to the same geometric properties of the document image, THEN proceeding to step (F); (D) IF a measure of foreground pixel density of the bounding box does not meet a predefined density criterion, THEN proceeding to step (F); (E) IF more than 50% of the foreground pixels that are part of the bounding box lie in straight lines, THEN the current non-text component is designated a candidate component; and (F) IF all non-text components within the document image have not yet been selected for possible reclassification, then returning to step (A).

Preferably in this approach, in step (C), the set of geometric properties includes a first sub-set including determining if the length of the bounding box is at least a first predefined percentage of the length of the document image and the width of the bounding box is at least a second predefined percentage of the width of the document image. Also preferably within step (C), the set of geometric properties includes a second sub-set including determining if the area of the bounding box is at least a third predefined percentage of the area of the document image, and the method proceeds to step (F) only if neither of the first sub-set nor the second sub-set of conditions are met. In this case, the first predefined percentage is 10%, the second predefined percentage is 10%, and the third predefined percentage is 10%.

Optionally in step (D), the measure of foreground pixel density is a measure of the foreground pixel density of the perimeter of the bounding box; and the predefined density criterion is defined as the foreground pixel density of the perimeter of the bounding box being greater than 80%.

Additionally in step (D), the measure of foreground pixel density is a measure of the foreground pixel density within the bounding box; and the predefined density criterion is defined as the foreground pixel density within the bounding box being less than 10%.

Alternatively in step (D): the measure of foreground pixel density is a measure of the foreground pixel density of the perimeter of the bounding box OR is a measure of the foreground pixel density within the bounding box; and the predefined density criterion is met if either the foreground pixel density of the perimeter of the bounding box is greater than 80% or if the foreground pixel density within the bounding box being less than 10%.

The above objects are also met in a processing device implementing the above-described method.

The above objects are further met in an electronic computing device for reclassifying non-text pixels within a document image, having: an input for accessing the document image, the document image having foreground pixels identified, wherein foreground pixels that have been deemed to be part of human readable printable characters are classified as text pixels and foreground pixels that have been deemed not to be part of human readable printable characters are classified as non-text pixels, and connected components of text pixels are defined as text components and connected components of non-text pixels are defined as non-text components; a data processor for: submitting each non-text component within the document image to a candidate selection process wherein each non-text component that is deemed to potentially include text content is designated a candidate component; and submitting each designated candidate component to a reclassification process wherein foreground pixels that form a specific geometric shape are removed, and the connected components defined by any remaining foreground pixels are reclassified as text components.

In this case, the specific geometric shape is a straight line of foreground pixels of minimum length, the minimum length being defined as a predefined percentage of the length of a corresponding side of the bounding box, and only foreground pixels that form lines not smaller than the minimum length are removed.

Also in this embodiment, straight lines of foreground pixels are identified using Hough Transforms, and the predefined percentage is 60%.

Furthermore, the reclassification process preferably includes: (i) identifying as target lines any straight lines of foreground pixels within the candidate component whose length is at least the minimum length; (ii) removing all identified target lines; and (iii) collecting into new non-text components any remaining foreground pixels within the candidate component's bounding box; and (iv) reclassifying as text-components the new non-text components.

Additionally, the candidate selection process preferably includes: (A) selecting for possible reclassification a current non-text component from the document image, wherein the selected current non-text component is a non-text component that has not previously been selected for possible reclassification; (B) defining a bounding box of the current non-text component; (C) IF (the length of the bounding box is not smaller than a first predefined percentage of the length of the document image AND the width of the bounding box is not smaller than a second predefined percentage of the width of the document image) OR (the area of the bounding box is not smaller than a third predefined percentage of the area of the document image) THEN proceeding to step (D), ELSE proceeding to step (F); (D) IF (the foreground pixel density of the perimeter of the bounding box is not smaller than a fourth predefined percentage) OR (the foreground pixel density within the bounding box is not greater than a fifth predefined percentage), THEN proceeding to step (E), ELSE proceeding to step (F); (E) IF more than 50% of the foreground pixels that are part of the bounding box lie in straight lines, THEN the current non-text component is designated a candidate component; and (F) IF all non-text components within the document image have not yet been selected for possible reclassification, then returning to step (A).

Preferably, the first predefined percentage is 10%, the second predefined percentage is 10%, the third predefined percentage is 10%, the fourth predefined percentage 80%, and the fifth predefined percentage 10%.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 2A to 2D illustrate examples of text pixels that are erroneously classified as non-text pixels in an image region, which may be a part of larger document image.

FIGS. 9A to 9C provide additional examples of image regions with misclassified non-text pixels.

FIGS. 10A to 10C illustrate the results of applying the present invention to the image regions of FIGS. 9A to 9C, respectively.

FIGS. 11A to 11C provide additional examples of reclassifying non-text pixels as text pixels in accord with the present invention.

DESCRIPTION OF THE PREFERRED EMBODIMENTS

The present invention is suitable for use with various methods of contact text detection in an image document, such as a scanned document. That is, it is suitable for use with various methods of classifying (i.e., labeling) pixels as text pixels (i.e., pixels that are part of human-readable glyphs) or non-text pixels (i.e., pixels that are not part of human-readable glyphs).

For terms of discussion, a connected-components collection of text pixels is hereinafter termed a text component, and a connected-components collection of non-text pixels is hereinafter termed a non-text component. Additionally, a component bounding block refers to the smallest rectangular box that can completely enclose a text component or a non-text component.

As it would be understood in the art, after an initial pixel classification where foreground pixels are classified as text pixels (or text components) or non-text pixels (or non-text components), the text pixels would be forwarded to an OCR process for text detection.

The present invention addresses the problem of text pixels (or text components) being misclassified as non-text pixels (or non-text components). Basically, after the above-described classification of pixels, the present invention reviews the classified non-text components and identifies any part of a non-text component that is actually comprised of text pixels. These parts of the non-text components are redefined as new text components. That is, the non-text pixels making up these parts of a non-text component are reclassified as text pixels, but pixels making up the remainder of the non-text components maintain their initial non-text classification.

To provide a reference of discussion, the initial steps of a prior art method of making an initial pixel classification is provided. It is to be understood that the specific method used for the initial "text" and "non-text" classification of components (or pixels) is not critical to the invention. The present invention processes the non-text component results of this initial pixel classification, irrespective of the method used in this initial pixel classification.

A preferred method for identifying text pixels (i.e. for pixel classification) is disclosed in U.S. patent application Ser. No. 13/051,223, "Identifying Text Pixels in Scanned Images", assigned to the same assignee as the present application and herein incorporated in its entirety by reference. As it would be understood, after construction of connected components (CC) of foreground pixels, the connected components would be submitted a pixel classification process (such as that of U.S. patent application Ser. No. 13/051,223) to identify (i.e. classify) text pixels and non-text pixels. It is to be understood, however, that any other text-pixel classification method may be used for this initial pixel classification process without deviating from the present invention.

Figure 1:
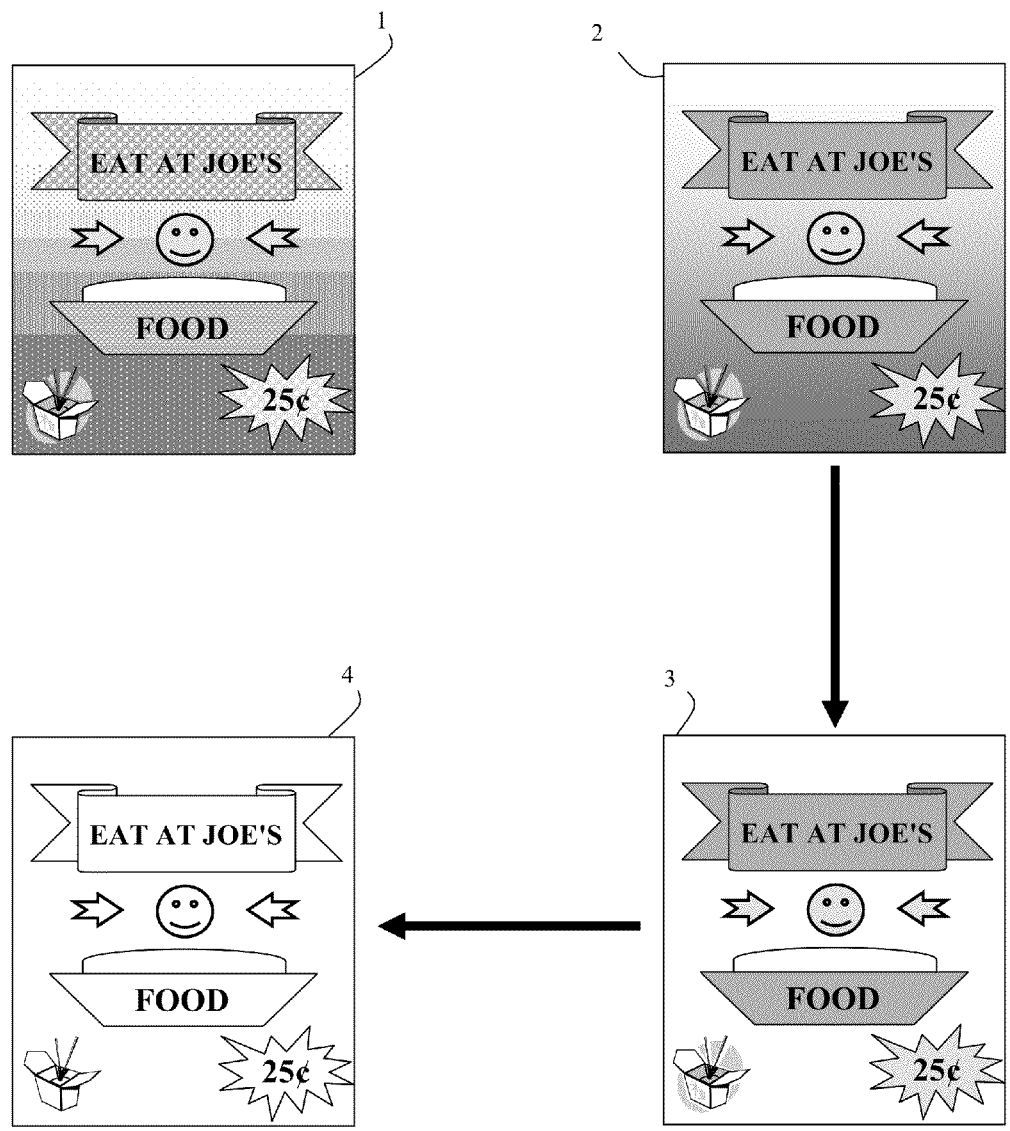
FIG. 1 illustrates an example of Label Aided Copy Enhanced pixel labeling.

For ease discussion, FIG. 1 provides one example of the construction of connected components for this initial pixel classification. An initial document image 1 may be smoothed and cleaned, if desired, to produce enhanced document image 2. Connected components may be constructed from original document image 1, or from optional enhanced document image 2. Assuming that enhanced document image 2 is used, the foreground pixels of enhanced image 2 are identified and labeled (for example, assigned a "foreground" label), as shown in image 3. Various methods of identifying foreground pixels are known, such as that described in U.S. Pat. No. 7,907,778, entitled "Segmentation-based Image Labeling", and assigned to the same assignee as the present application. Finally, connected-components (CC) are constructed from the foreground labeled pixels, as shown in CC image 4, U.S. patent application Ser. No. 13/051,223, The connected components of CC image 4 would then be submitted to a pixel classification process, such that of U.S. patent application Ser. No. 13/051,223, for classification as text components or non-text components.

A difficulty can arise when text pixels are adjacent non-text pixels. This is because the text pixels that contact non-text pixels may be incorporated into the non-text CC defined by the non-text pixels. This is particularly problematic in document images containing text tables, charts, or linear boundaries between strong changes in color regions. Text pixels that cross, or are in contact with, line structures defined by the text tables, charts, linear boundaries, etc. will be erroneously identified as being part of the non-text connected component defined by the line structures.

As is explained above, an objective is to submit only text pixels to an OCR process, and so the removal of non-text components, such as those defined by line structures is advisable. However, it has been found that removing line structures may result in the removal of text glyphs. That is, text characters that contact line structures tend to be interpreted as integral parts of the non-text component comprised by the line structures. Thus, when these line structures are removed, any text glyphs were deemed to be part of the line structures during the initial pixel classification process are likewise removed. The removed text glyphs may constitute entire text characters or parts of text characters. In either case, their removal introduces errors into the subsequent OCR process.

Contact texts are herein defined as text characters that are adjacent (or connected) to line structures or to image boundaries, such as the boundary between foreground and background regions or the boundary of large font text characters. Because pixel classification processes may look for line structures and classify all pixels that are part of the line structure connected components as non-text pixels, it is possible that some contact texts will be misclassified as non-text pixels, i.e., be identified as part of the non-text component defined by the line structure.

With reference to FIGS. 2A to 2D, various examples of misclassified contact texts are shown within circles 11 for ease for identification. In each case, the misclassified texts are in direct, or indirect, contact with a non-text component defined by a line structure.

In FIG. 2A, circles 11 identify misclassified text components (i.e., four instances of letter "p") that are in direct contact with non-text connected component 10, which is comprised of the lines of a table.

Figure 2B:
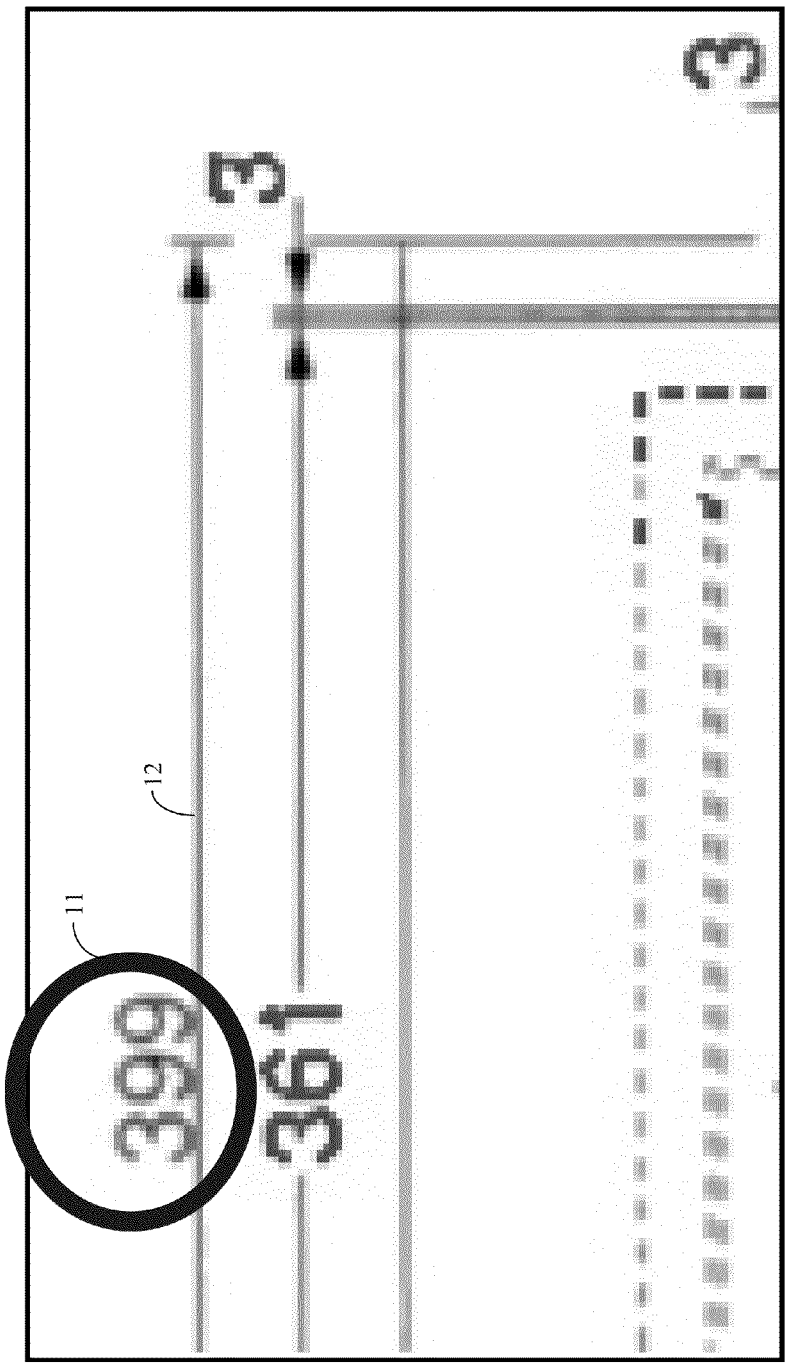

In FIG. 2B, circle 11 identifies misclassified texts "399" that are in direct contact with the non-text component 12, which is part of a guide arrow.

Figure 2C:
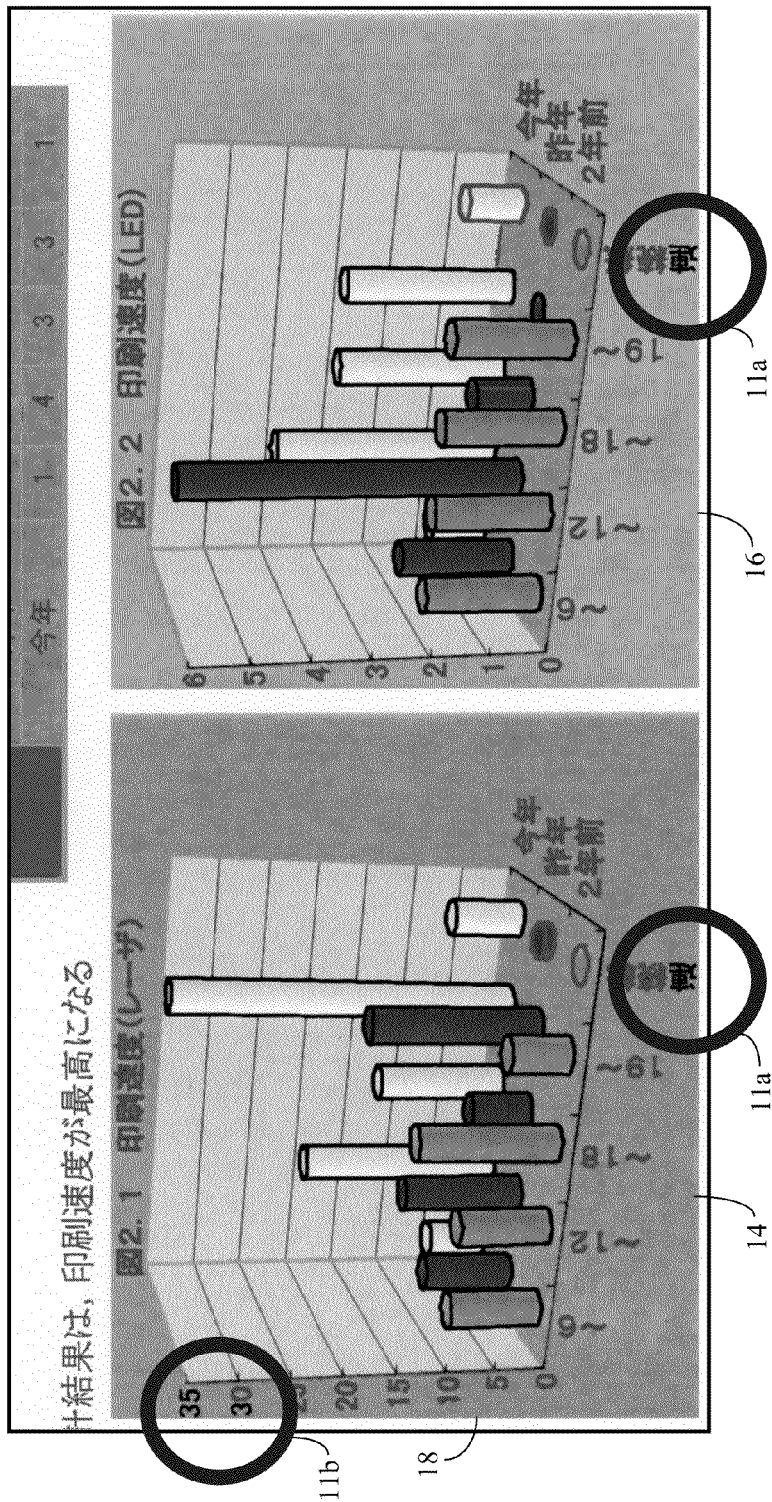

In FIG. 2C, circles 11a identifies misclassified texts in direct contact with boundaries 14 and 16 at abrupt color (or intensity level) changes. Similarly, circle 11b identifies two instances of misclassified text "3" that are in direct contact with boundary line 18. Circle 11b also identifies misclassified text "5", which is in indirect contact with boundary line 18 via adjacent text character "3".

Figure 2D:
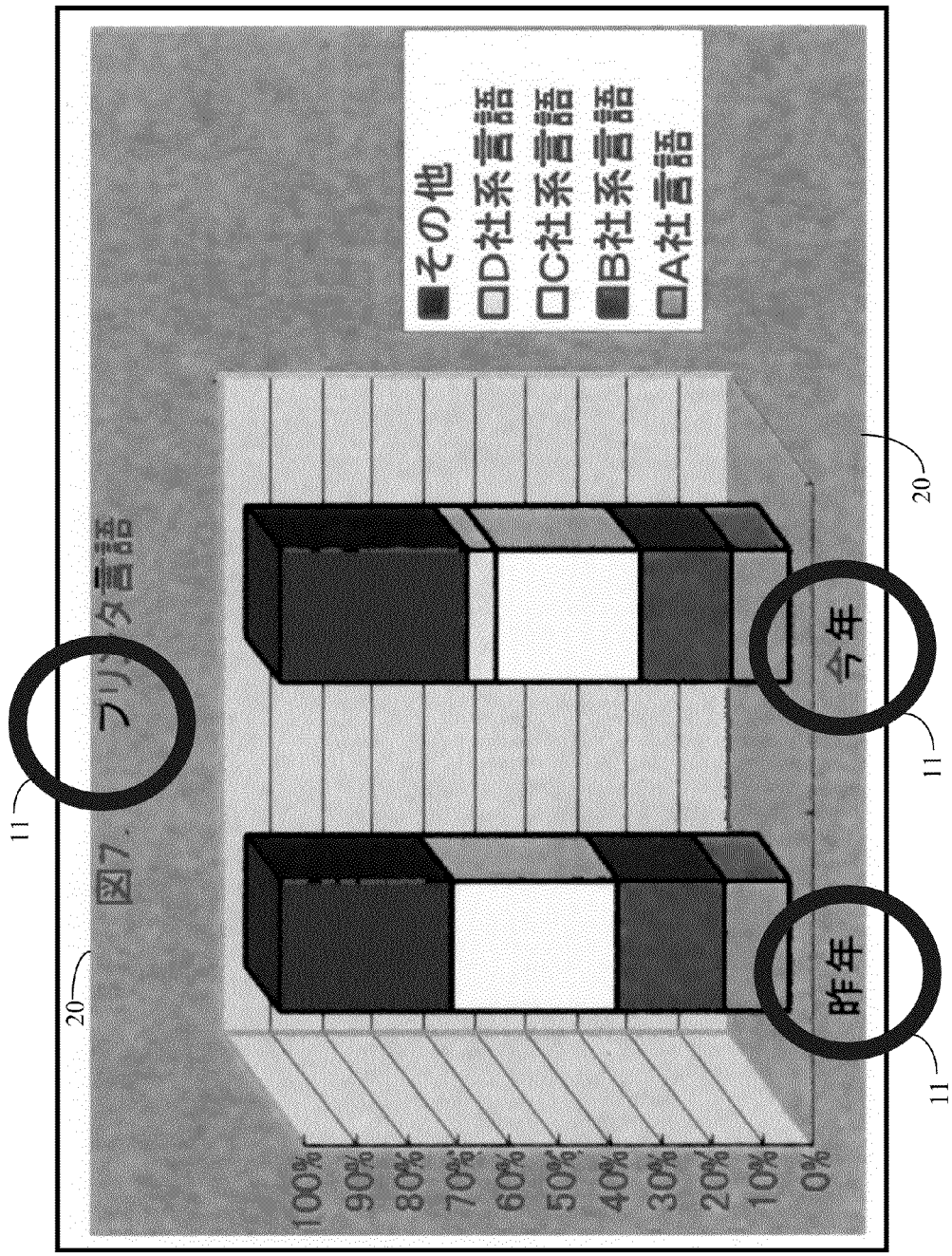

Similarly in FIG. 2D, circles 11 identify misclassified text characters that are in contact with boundary 20

Figure 3:
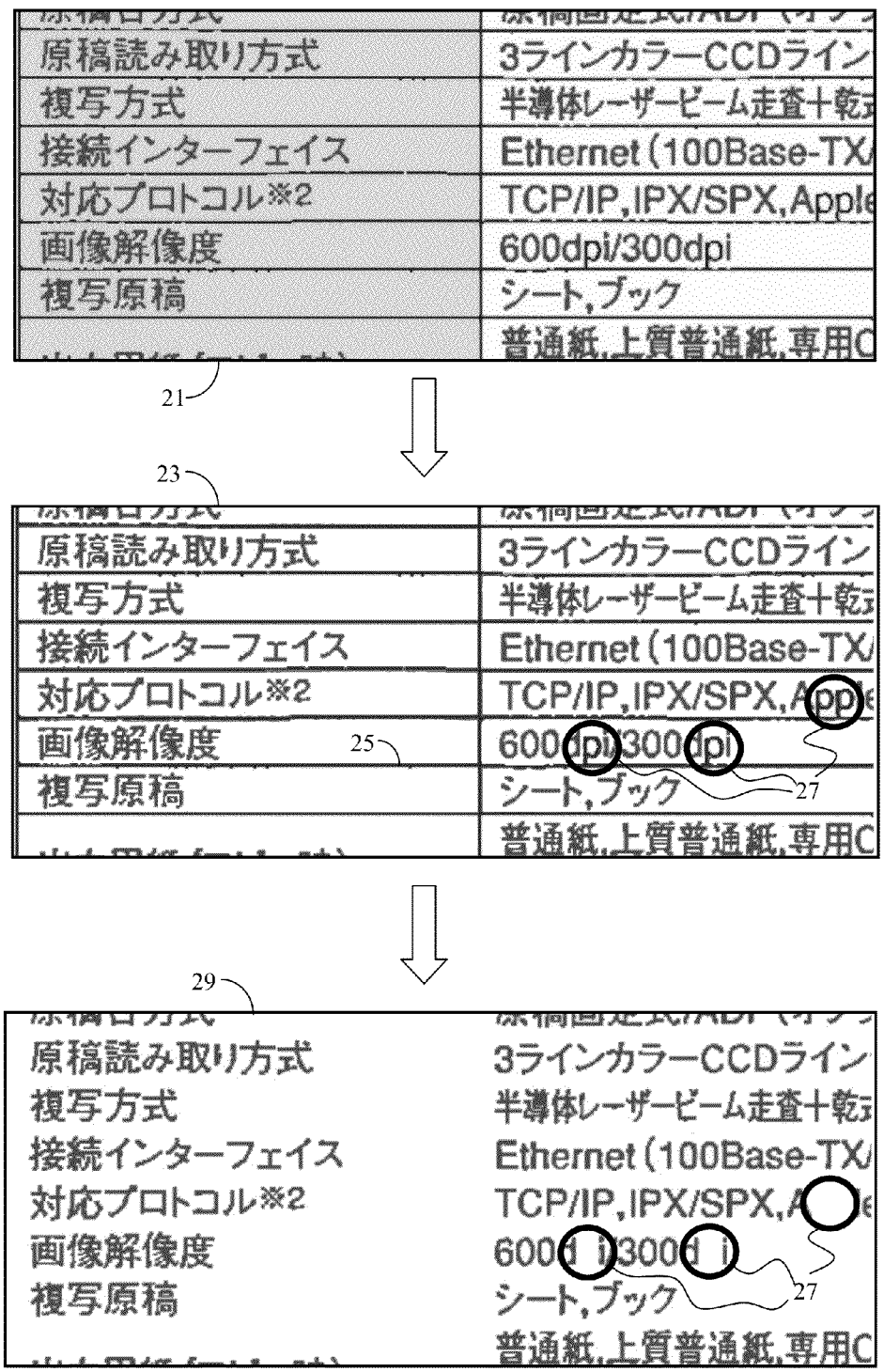
FIG. 3 illustrates how text pixels that have been misclassified as non-text pixels may be mistakenly removed with the removal of non-text components.

A more detailed explanation of the present problem is illustrated in FIG. 3. Reference character 21 shows at least part a document image, such as can be obtained by scanning. Reference character 21 defines a close up view (or region) of a table structure. As it would be understood in the art, the outline of the table would constitute a single, large non-text component. It is also to be understood, however, that the image region defined by reference character 21 may also constitute the entirety of a document image. Nonetheless for ease of discussion and to provide a larger viewing area, the following discussion will in general, discuss enlarged views (or image regions) of large, non-text, connected-component structures that encompass smaller text components.

A first step is to identify all foreground pixels within image region 21, and to construct connected component structures of the identified foreground pixels resulting in connected-components image 23. As before, the straight lines 25, which comprise the table structure in the present example, constitute a single non-text component surrounding a plurality of smaller text components comprised of text contents. Also as before, it is noted that lower-case "p" text characters (identified by circles 27) that touch the lines of the table structure are identified as part of non-text component 25 during the construction of the connected-components.

It is herein assumed that an initial pixel classification process (such as that described U.S. patent application Ser. No. 13/051,223) would identify the connected-component structure defined by the straight lines 25 of the table as a non-text component and identify text content as text components. The non-text components would then be removed from consideration. This would leave only the text components, such as shown in processed image 29, for consideration. Ideally, processed image 29 should identify all the text components, and it would be submitted to an OCR process for text character recognition. As illustrated by the empty space within circles 27 in processed image 29, however, removal of non-text component 25 resulted in the removal of the pixels that comprise lower case "p" text characters since these pixels were misclassified as non-text for being part of non-text component 25.

Figure 4:
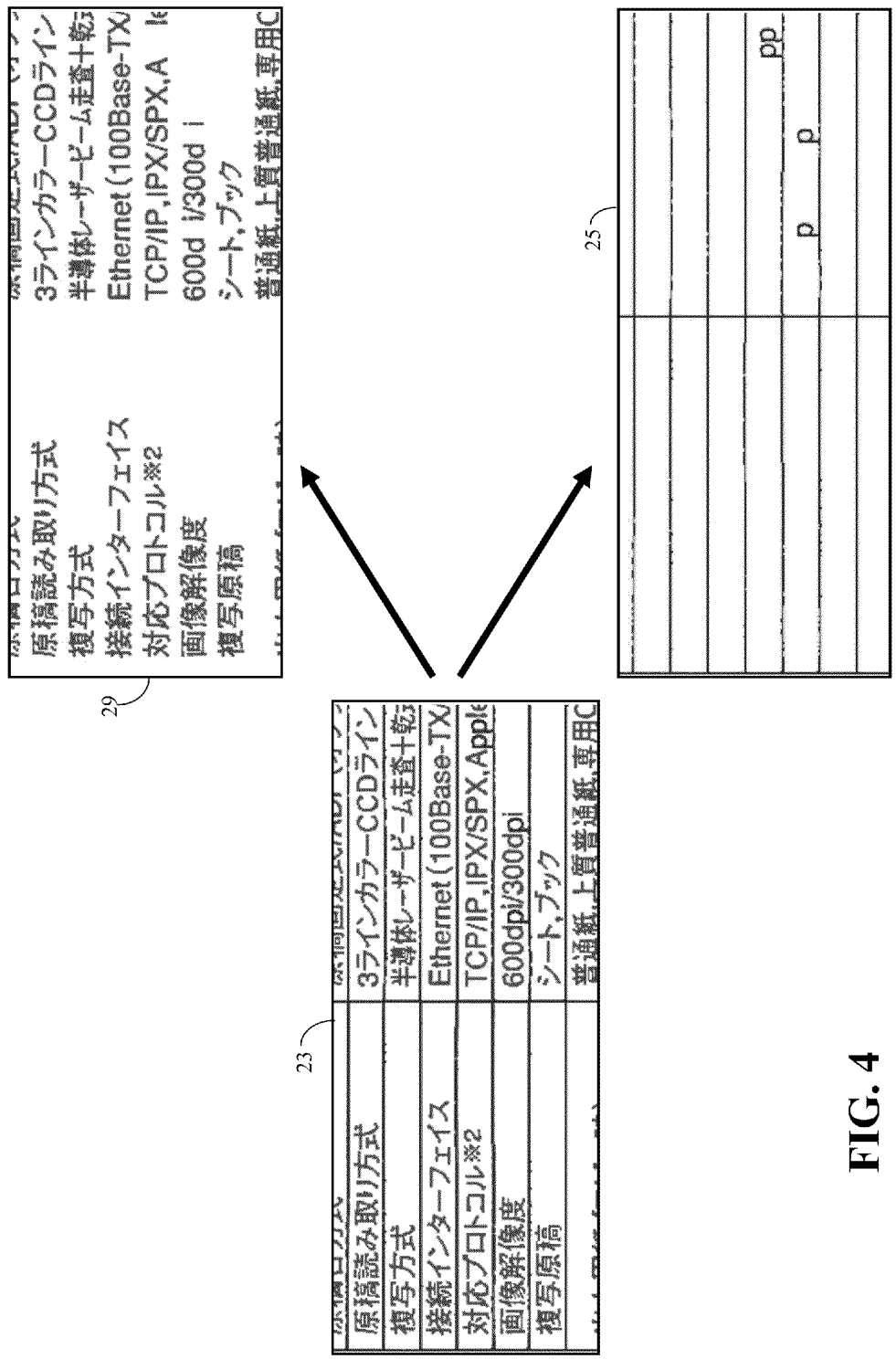
FIG. 4 illustrates that a reason for the mistaken remove, as shown in FIG. 3, is that the misclassified non-text pixels are often incorporated into the structure of a larger non-text component.

The essence of this problem is illustrated in FIG. 4. Connected-components image 23 is separated by component classification. For example, the text components comprise processed image 29, as is explained above in reference to FIG. 3. The non-text component of connected-components image 23 is shown as non-text component 25.

A goal of the present invention is to identify the portion of a non-text component (such as non-text component 25) that is comprised of misclassified text pixels (such as the lower-case p's), and to reclassify as text pixels only those misclassified pixels among all the non-text pixels of the non-text component.

Identifying possible misclassified text pixels among all the non-text pixels that constitute a non-text components can be challenging since non-text components may have innumerable shapes and sizes.

Figure 5:
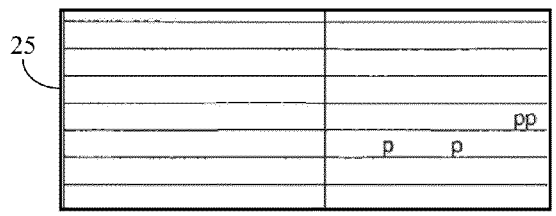
FIG. 5 provides several examples of non-text components, including one that incorporates misclassified non-text pixels.
Figure 5:
Figure 5:
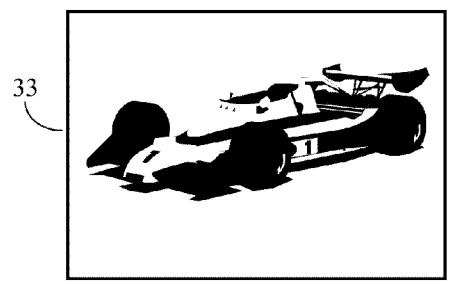
Figure 5:
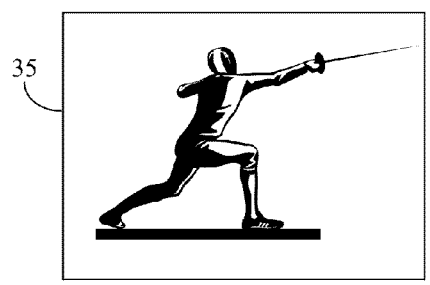
Figure 5:
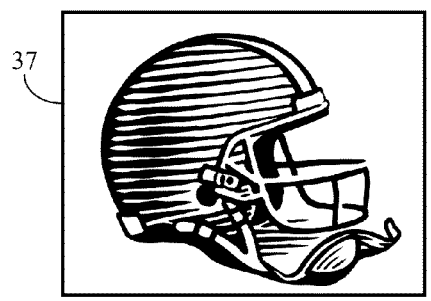

With reference to FIG. 5, it is not often that non-text components encompass misclassified text pixels. Indeed, non-text components may take many forms and shapes, such as illustrated by sample non-text components 25, 31, 33, 35, and 37. A first step is therefore to process all non-text components and identify as candidate component only those non-text components that might include misclassified text pixels. Once the candidate components have been identified, then they may be further processed to attempt to recover misclassified text pixels (or misclassified text components).

It has been found, as illustrated in FIGS. 2A to 2D, that misclassified text pixels may often be found adjacent long line structures. The presently preferred embodiment takes advantage of this observation and focuses its search for candidate components on identifying non-text components that may include long straight lines. A preferred process for identifying candidate components is illustrated in FIG. 6.

Figure 6:
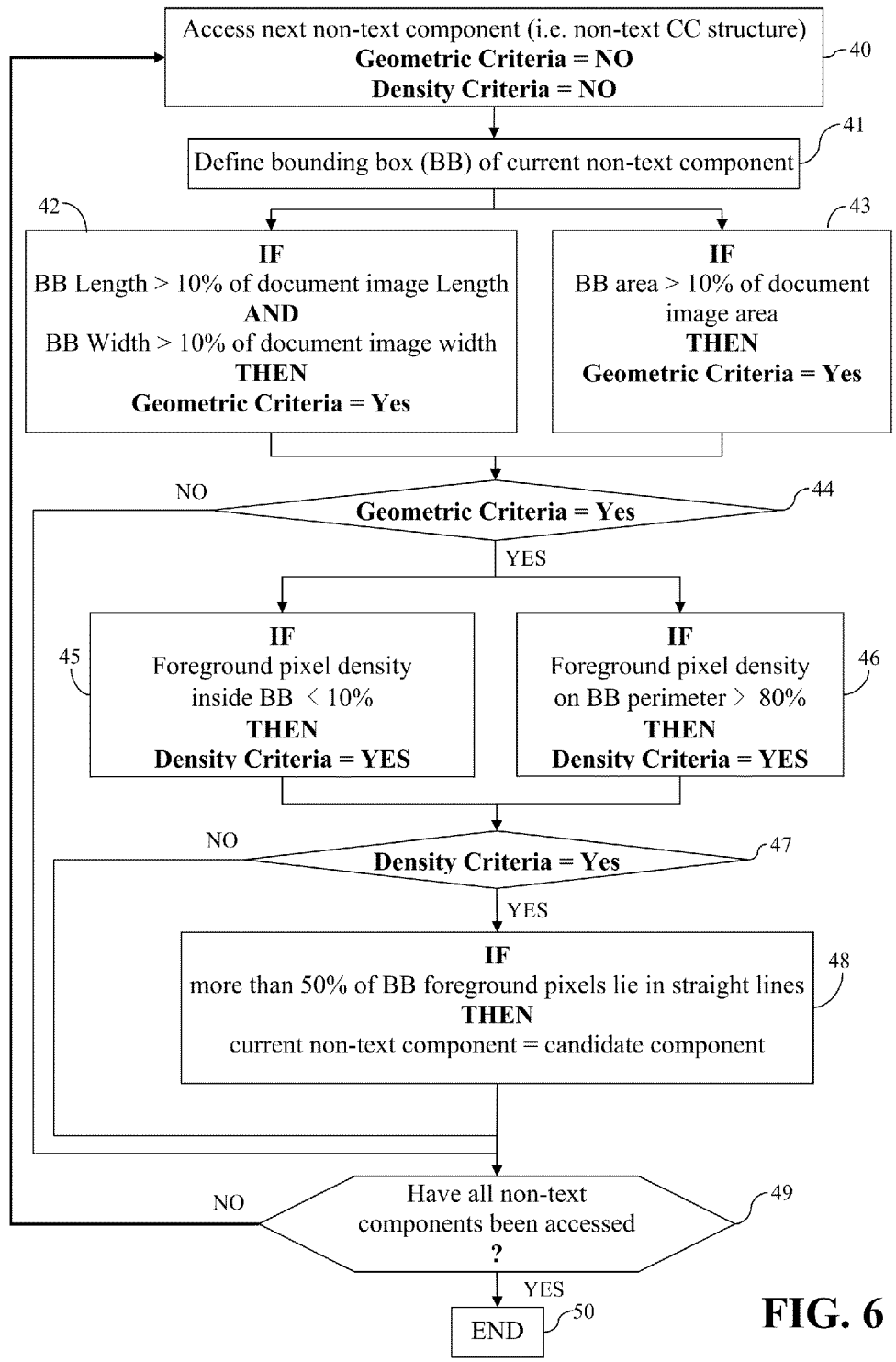
FIG. 6 is a flow chart of a process for going through non-text components and identifying as candidate components the ones that might include misclassified text pixels.

With reference to FIG. 6, a first step 40 is to access each non-text component within a document image, and to apply the following steps to each accessed non-text component. That is, when all the non-text components within a document image have been accessed and processed, as indicated by step 49, this process of seeking and identifying candidate components ends at step 50 for the current document image. To accommodate two conditional OR statement, two memory locations (one defined as Geometric Criteria and the other defined as Density Criteria) are used to store variable information. These two memory locations server to hold the results of test conditions, as explained more fully below.

The following steps are applied, in turn, to each accessed non-text component (i.e., to each non-text CC structure within the current document image). After a currently accessed non-text component is processed, any other remaining non-text component within the current document image that has not yet been processed is accessed, as indicated by step 49.

For a currently accessed non-text component (step 40), its bounding box is defined or identified (step 41). Various geometric properties of the defined bounding box are then compared with the corresponding geometric properties of the document image.

Steps 42 to 43 compare two sets of geometric properties of the bounding box of the current non-text component to corresponding geometric properties of the entire document image. If either set of geometric properties is true (i.e. if first predefined criteria as specified in step 42 is met OR a second predefined criteria as specific in step 43 is met), then processing of the current non-text component continues. Otherwise the current non-text component is disregarded as not containing text content, and the process jumps to step 49 to access another non-text component for processing.

Step 42 determines if the length of the bounding box is greater than a first predefined percentage (preferably 10%) of the length of the document image and if the width of the bounding box is greater than a second predefined percentage (preferably 10%) of the width of the document image. If both of these criteria are met, then memory location Geometric Criteria is set to "YES".

In comparing the length or width of the bounding box to the length and or width, respectively, of the document image, it is noted that the dimensions of non-text component might not be perfectly parallel to the dimensions of the document image. For example, the length dimensions of a non-text component might be diagonal to the edge dimensions of the document image, such that it may not be straight forward to identify the corresponding length edge of the document image to which to compare the length dimension of the current non-text component's bounding box. In this case, to define the length edge dimension of the document image to correspond to the length dimension of the bounding box, one may project the length dimension of the bounding box to the edges (i.e. sides) of the document image, and the edge dimension that the receives the longest projection may be selected as corresponding to the length dimension of the bounding box, and be compared with it.

Similarly to compare the width dimension of the bounding box with the corresponding width edge dimension of the document image, the corresponding width edge dimension of the document image may be defined by projecting the width dimension of the bounding box to the edges (i.e. sides) of the document image. The edge dimension of the document image that receives the longest projection may be selected as corresponding to the width dimension of the bounding box, and be compared with it.

Step 43 determines if the area of the bounding box is greater than a third predefined percentage (preferably 10%) of the area of the document image. If it is, then memory location Geometric Criteria is set to "YES". Thus, if either of the criteria of step 42 or the criteria of step 43 is met, memory location Geometric Criteria is set to "YES"; otherwise memory location Geometric Criteria retains its setting of "NO" from step 40.

By checking the status of memory location Geometric Criteria, step 44 determined if either the criteria set of step 42 or the criteria set of step 43 is met. If either of the two sets of criteria is met, as determined in step 44, then processing proceeds to steps 45 and 46. Otherwise, processing jumps to step 49 where the current non-text component is discarded as containing text content and it is determined if there are any additional non-text components to be processed.

Steps 45 and 46 check if the foreground density of the bounding box meets either of two density criteria. If the density criteria of step 45 is met or if the density criteria of step 46 is met (as determined by step 47), the processing continues to step 48. Otherwise the current non-text component is disregarded as not containing text content, and the process jumps to steps 49 to access another non-text component for processing, if available.

In step 45, the foreground pixel density within the bounding box is checked to determine if it is low. More specifically, if the foreground pixel density within (i.e., inside) the current bounding box (i.e., bounding box of the current non-text component) is less than a fourth percentage (preferably 10%), then variable memory Density Criteria is set to "YES". As it would be understood, the foreground pixel density within the bounding box may be determined by determining the percentage of pixels within the bounding box that are foreground pixels.

Step 46 determines if the percentage of foreground pixels on the bounding box (i.e. along the perimeter of the bounding box) is high. More specifically, if the foreground pixel density on the perimeter of the current bounding box is greater than a fifth percentage (preferably 80%), then variable memory Density Criteria is set to "YES".

Thus, if either the density criteria of step 45 are met or the density criteria of step 46 are met, then variable memory Density Criteria is set to "YES". Otherwise, variable memory location Density Criteria retains its setting of "NO" from step 40.

Step 47 determined is either the criteria of step 45 or step 46 was met, as indicated by the setting of variable memory Density Criteria. If neither of the criteria of step 45 or 46 was met (step 47=NO), then processing proceeds to step 49 to discard the current non-text component and to determine if there are any additional non-text components within the current document image to be processed. Otherwise processing continues to step 48.

In step 48, the geometric shape of structures composed of the foreground pixels within the current bounding box is determined. If a majority (i.e., more than 50%) of the foreground pixels within the current bounding box lie in straight lines, then the current non-text component is designated a "candidate component".

Step 49 determines if there are any other non-text components within the document image that have not yet been processed. If there are (step 49=NO), then processing returns to step 40 to access the next non-text component that has not yet been processed. Otherwise (step 49=YES) the search for candidate components ends at step 50.

Figure 7:
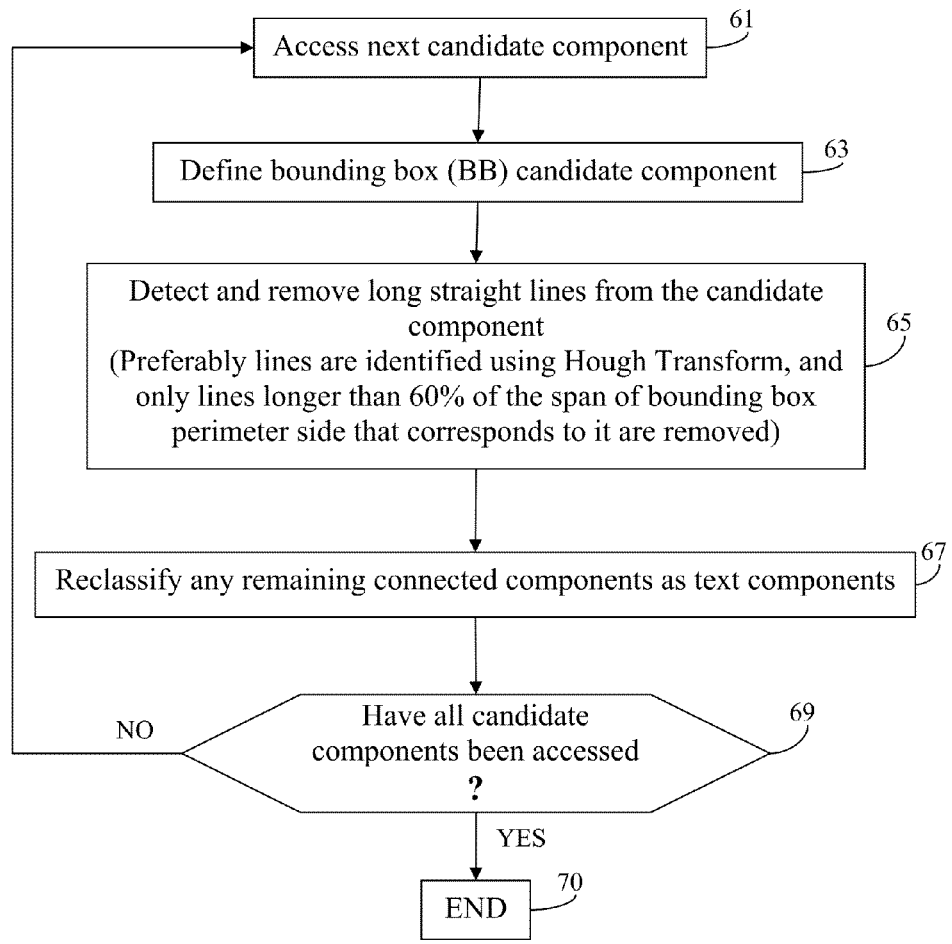
FIG. 7 illustrates a flow chart for processing candidate components to reclassifying as text pixels and misclassified non-text pixels.

Once the candidate components have been identified, processing continues to the process of FIG. 7, to examine the candidate components and correct misclassified text pixels (i.e. correct misclassified text components). The following steps are applied, in turn, to each candidate component, as determined in step 48 of FIG. 6. Thus, one begins by accessing a candidate component (step 61), and defining its bounding box (step 63).

In step 65, long straight lines within an accessed candidate component are identified and removed. Preferably, straight lines are identified using the Hough Transform, or any other line detection method known in the art, and any detected line longer than 60% of the span of a corresponding perimeter side of the bounding box is removed. If desired, to define the corresponding perimeter side of the bounding box that corresponds to the detected line, one may project the detected line to the perimeter sides of the bounding box, and the perimeter side that receives the longest projection may be selected to correspond to the detected line.

For example, if a detected line is found to correspond to the bounding box's height perimeter side (i.e., its height dimension or height edge dimension), then the length of the detected line is compared to the bounding box's height dimension. Similarly, if a detected line is found to correspond to the bounding box's perimeter length side (i.e., its length dimension or length edge dimension), then the length of the detected line is compared to the bounding box's length dimension. As it would be understood, since only the straight lines are removed, any extraneous non-text pixels that are part of the candidate component, but are not on any of the removed lines, are preserved. Thus in step 67 any preserved connected-components defined by the remaining non-text pixels within the bounding box (i.e., pixels that were not part of the removed lines) are reclassified as text components.

If all candidate components have been processed (step 69=YES), then processing ends (step 70), otherwise, processing returns to step 61 and the next candidate component not yet processed is accessed.

As an example, the process of FIG. 6 for identifying candidate components may be applied to non-text regions 25, 31, 33, 35, and 37 of FIG. 5. Using the criteria of FIG. 6, it is readily evident that only non-text component 25 would meet these criteria and be deemed a candidate component.

Figure 8:
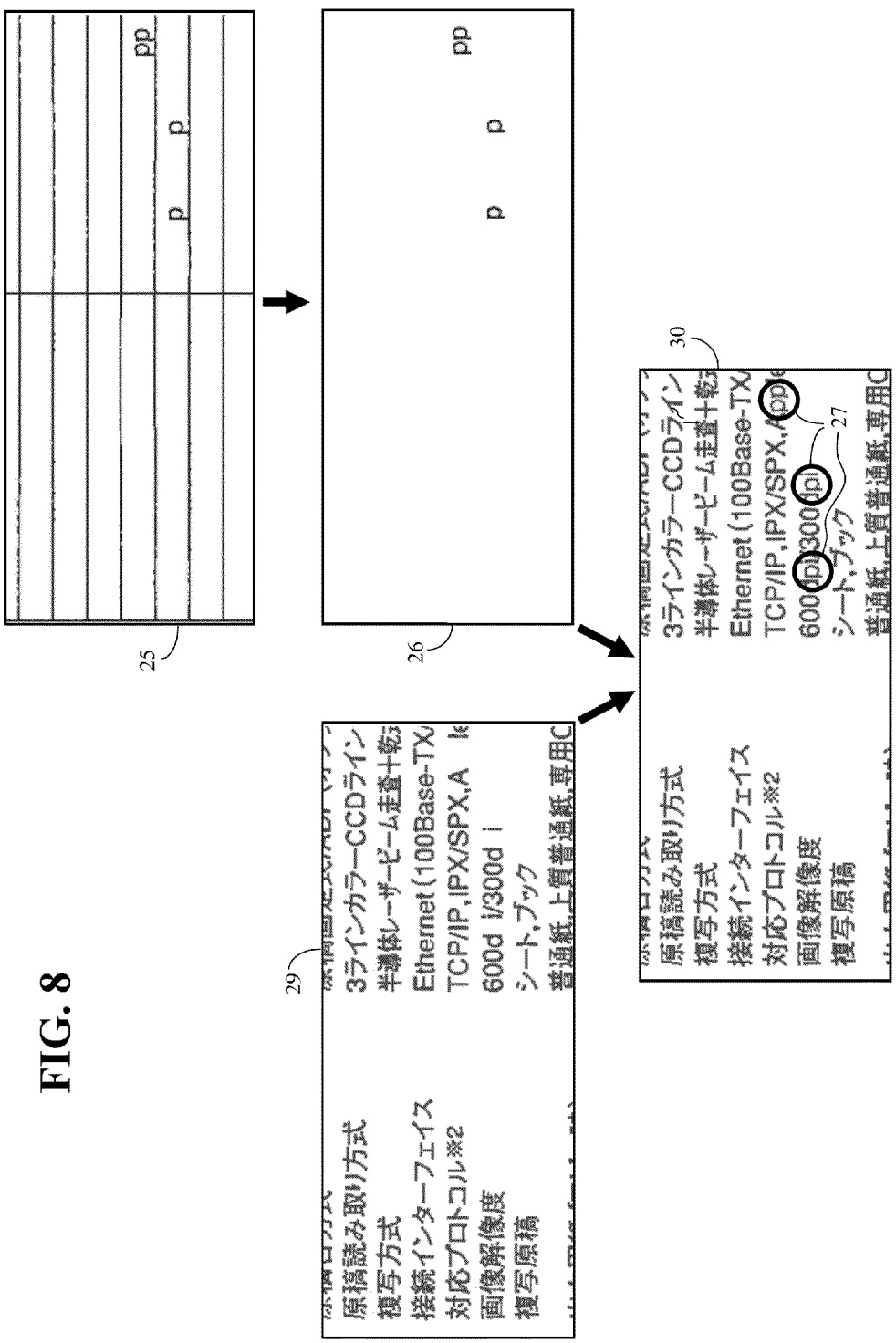
FIG. 8 illustrates how the present invention may be applied to the example of FIG. 4 to recover text pixels reclassified by the present invention.

FIG. 8 illustrates application of the reclassifying process of FIG. 7 to non-text (i.e., candidate) component 25 of FIG. 5. For ease of illustration, the plurality of text components 29 is also shown. As was the case in FIG. 4, text components 29 are missing the lower case "p" texts that were incorporated into non-text component 25. Using the process of FIG. 7, however, the long straight lines within candidate component 25 are identified and removed resulting in preserved non-text pixels (i.e. preserved non-text components) shown in region 26. These preserved non-text components are then reclassified as text components and joined to the remaining text components 29 to construct recovered text component region 30. Circles 27 indicate the recovered text components.

As it would be understood, text component region 30 would be sent to an OCR process to recover the text characters defined by the text components. Any suitable OCR process known in the art may be used, without deviating from the present invention.

The presently preferred embodiment was tested on various non-text components that included misclassified text pixels. A first set of these tests was run on image regions 81A to 83A of FIGS. 9A to 9C, respectively. In each of image regions 81A to 83A, the identified candidate component includes not only the line structure making up a chart, but also the encircled misclassified text components, show in a lighter shade of gray than the correctly classified text-components. As before these non-text components are misclassified text components that were erroneously made part of the chart non-text component by an initial pixel classification process.

Figure 10A:
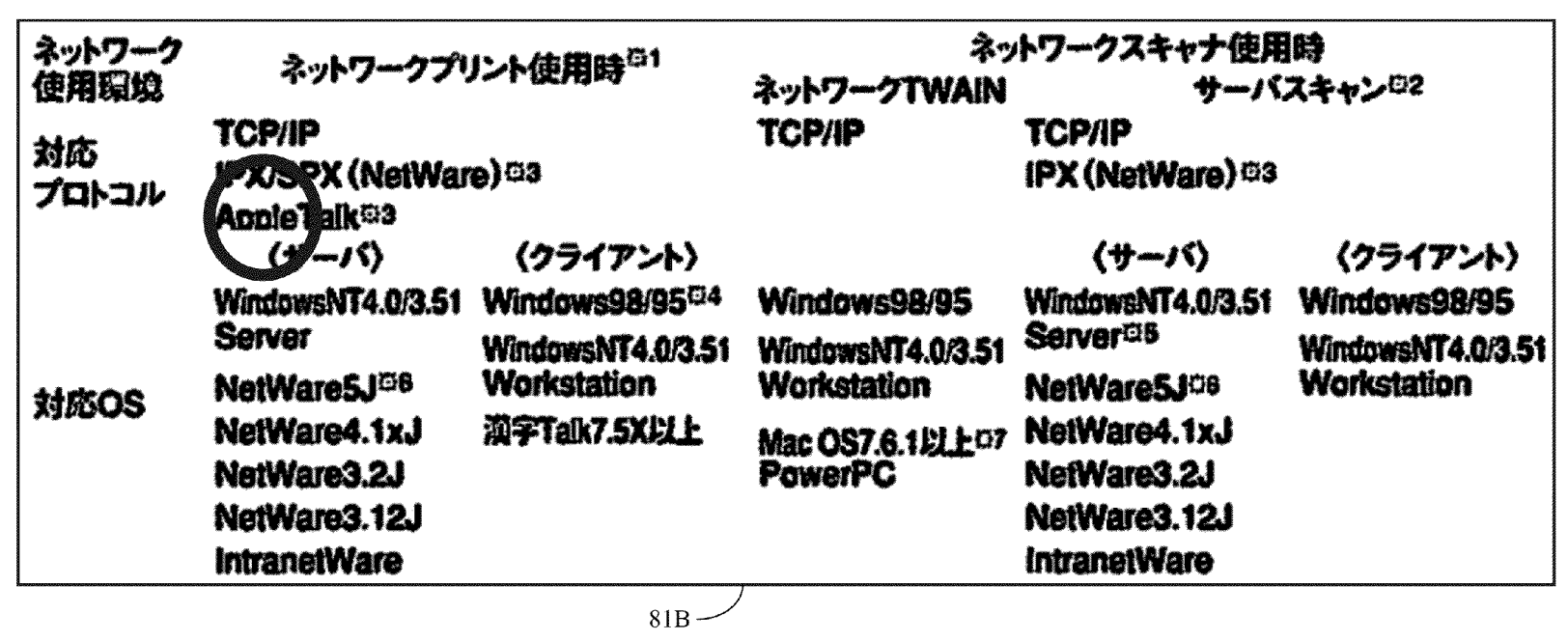
Figure 10B:
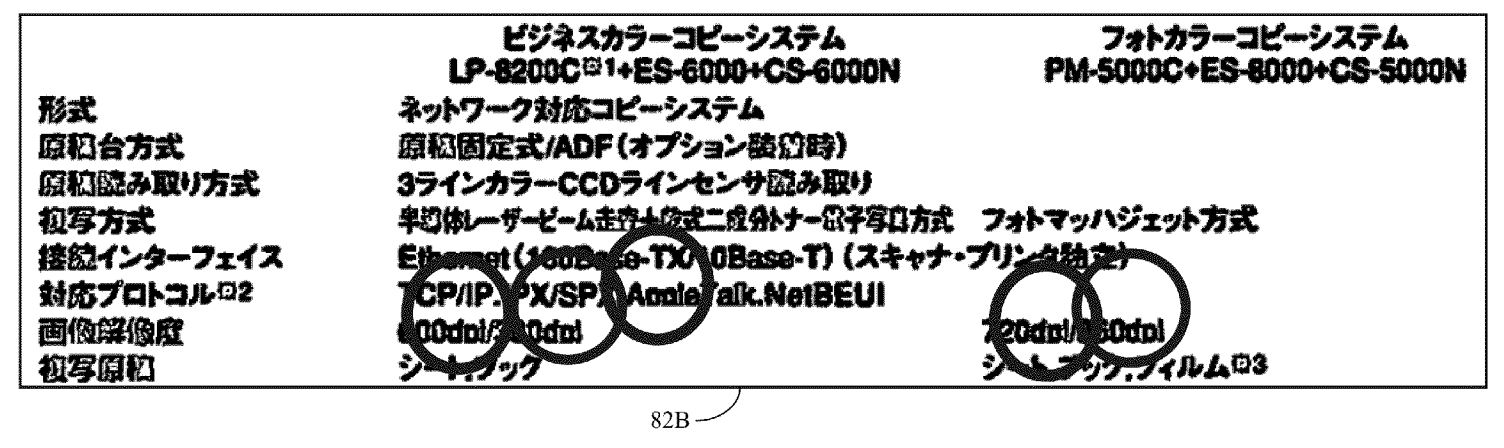
Figure 10C:
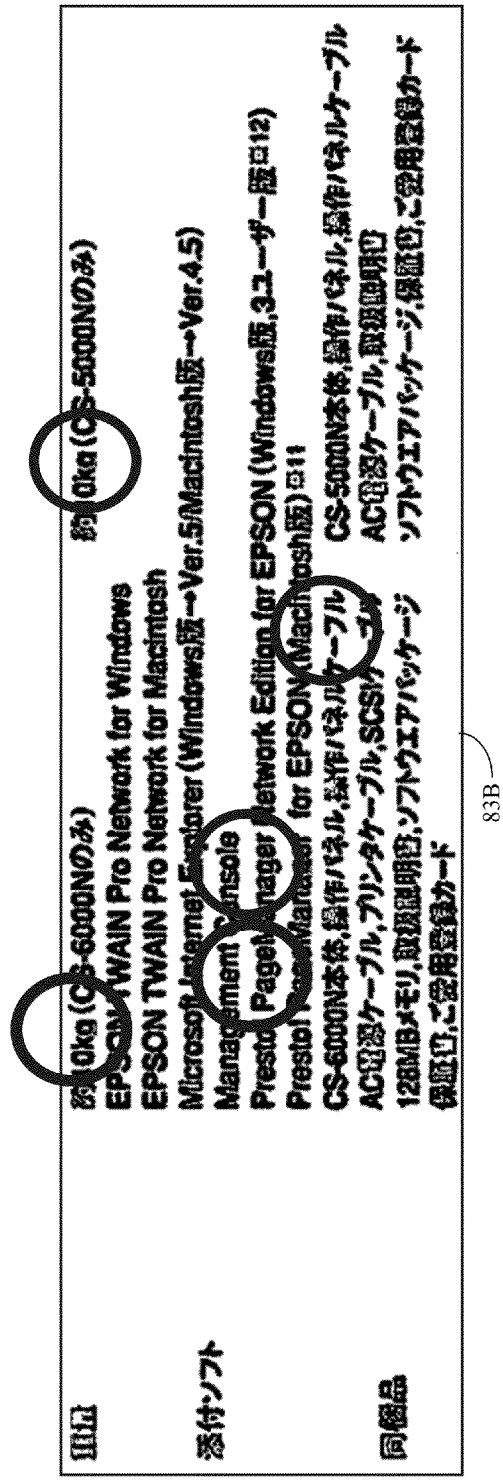

After applying the presently preferred method, as illustrated in FIGS. 6 and 7, the portion of the misclassified texts that do not overlap a line of the chart are reclassified as text components, as illustrated by text component regions 81B to 83B in FIGS. 10A to 10C, which include reclassified (i.e. recovered) text-components. The previous misclassified text components shown encircled in FIGS. 9A-9C, are reclassified as text components and shown encircled in FIGS. 10A to 10C.

Figure 11A:
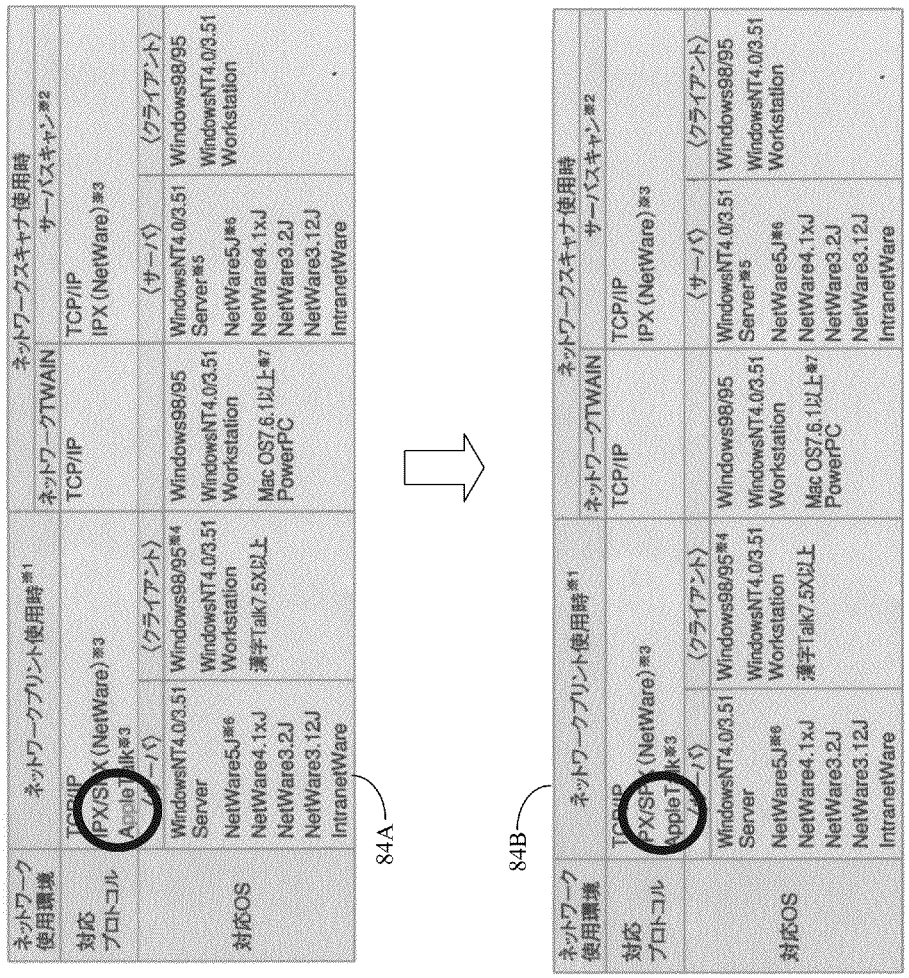
Figure 11B:
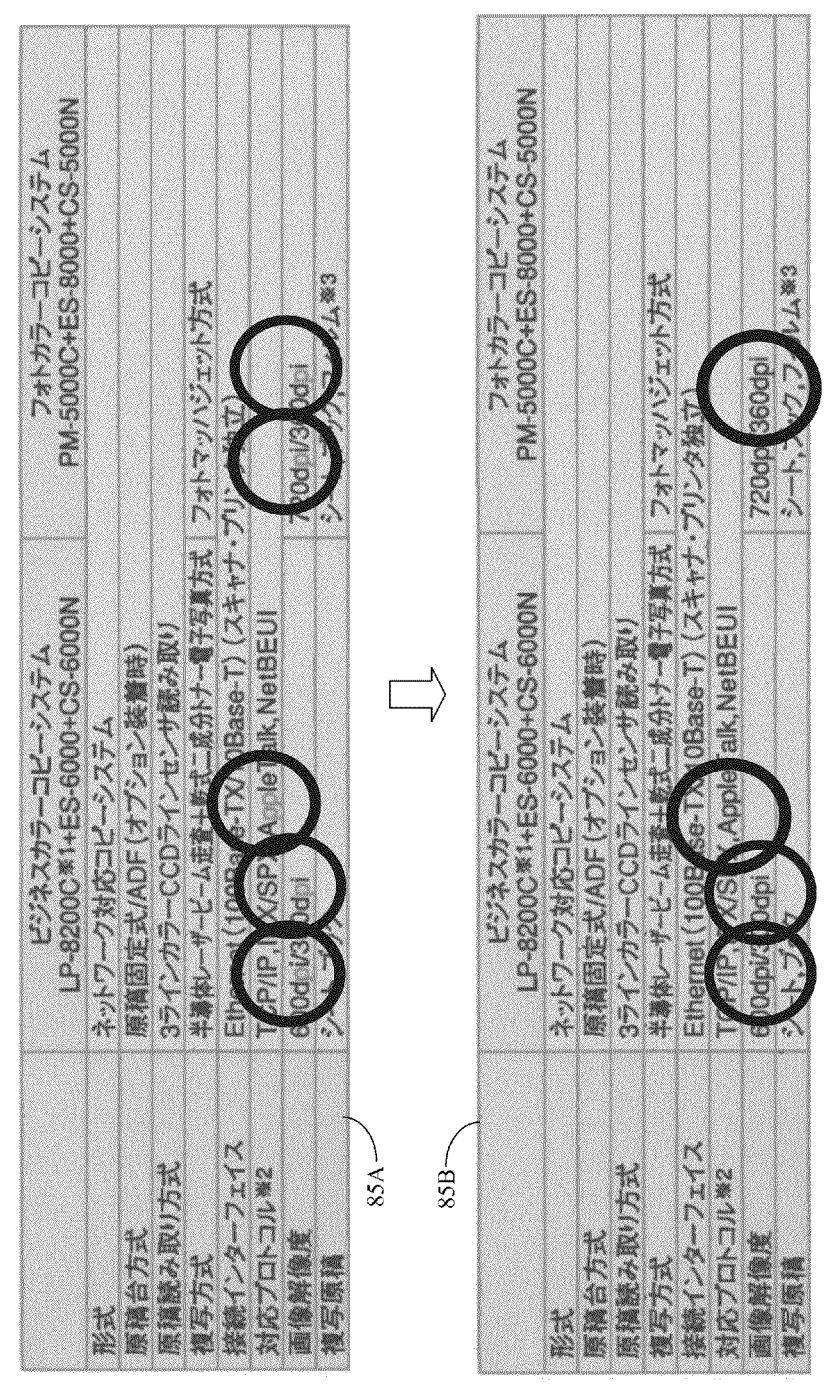

Three additional examples are shown in FIGS. 11A to 11B. In FIG. 11A, misclassified non-text pixels that are part of a non-text component defined by a line chart are shown in gray and are encircled in image region 84A for ease of description. The result of applying the present invention is the reclassified and reconstructed image region 84B, where reclassified text components are encircled for ease of viewing.

In FIG. 11B, misclassified text components that are part of a non-text component defined by a line chart are shown in gray and are encircled in image region 85A for ease of description. The result of applying the present invention is the reclassified, and recovered, image region 85B, where reclassified text components are encircled for ease of viewing.

Figure 11C:
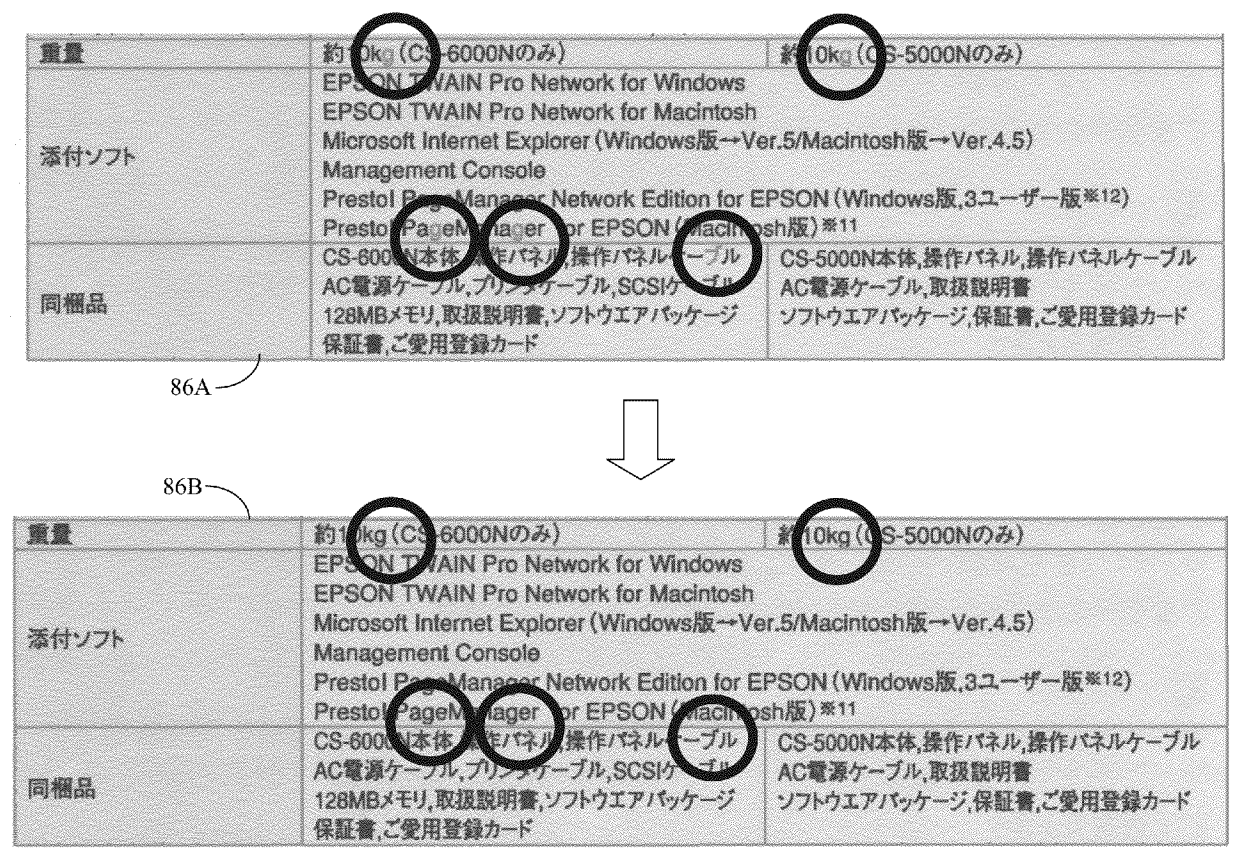

In FIG. 11C, misclassified non-text pixels that are part of a non-text component defined by the line chart are shown in gray and are encircled in image region 86A for ease of description. The result of applying the present invention is the reclassified image region 86B, where reclassified text pixels are encircled for ease of viewing.

Figure 12A:
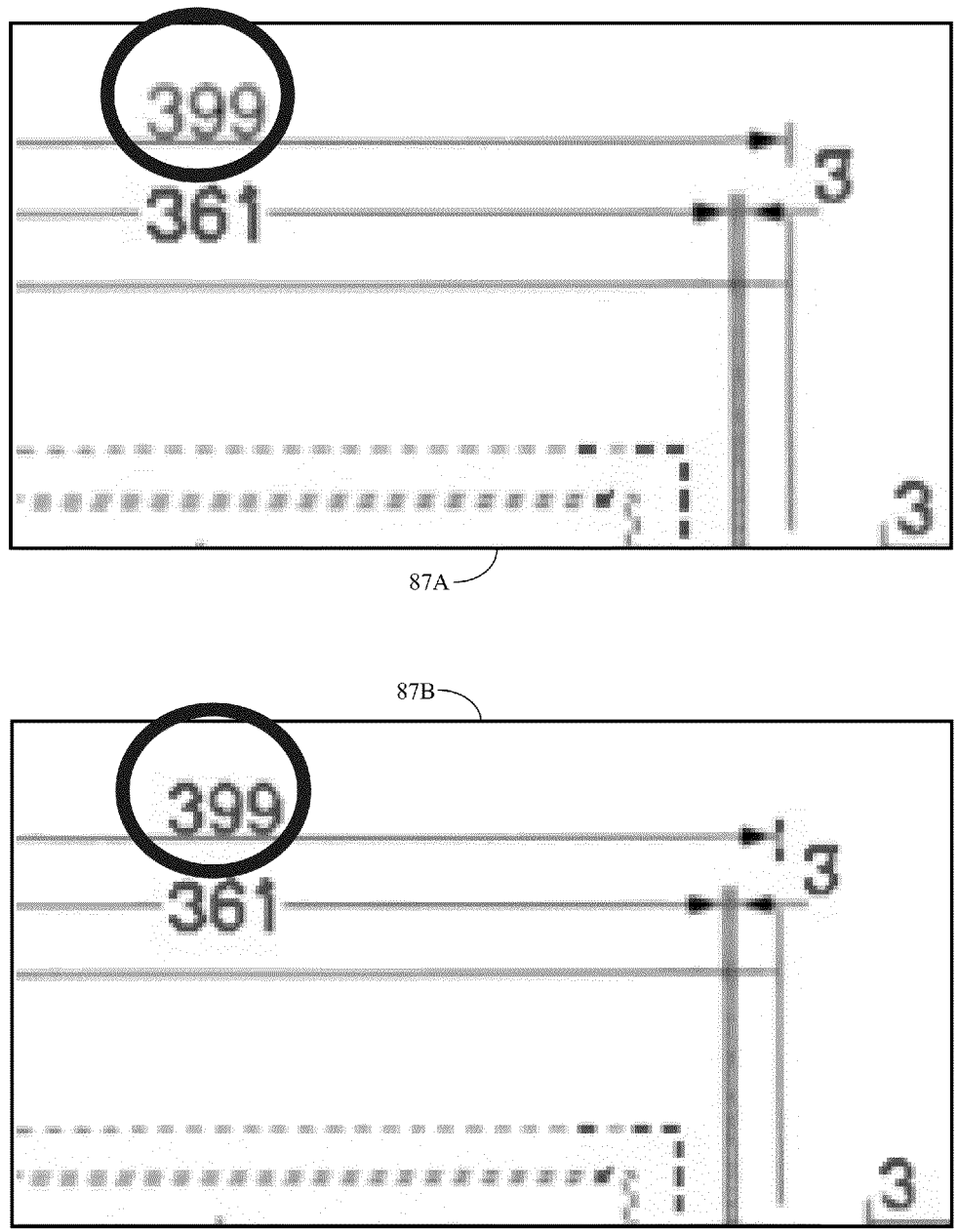
FIGS. 12A to 12C illustrate the results of applying the present invention to the image regions of FIGS. 2B to 2D, respectively.
Figure 12B:
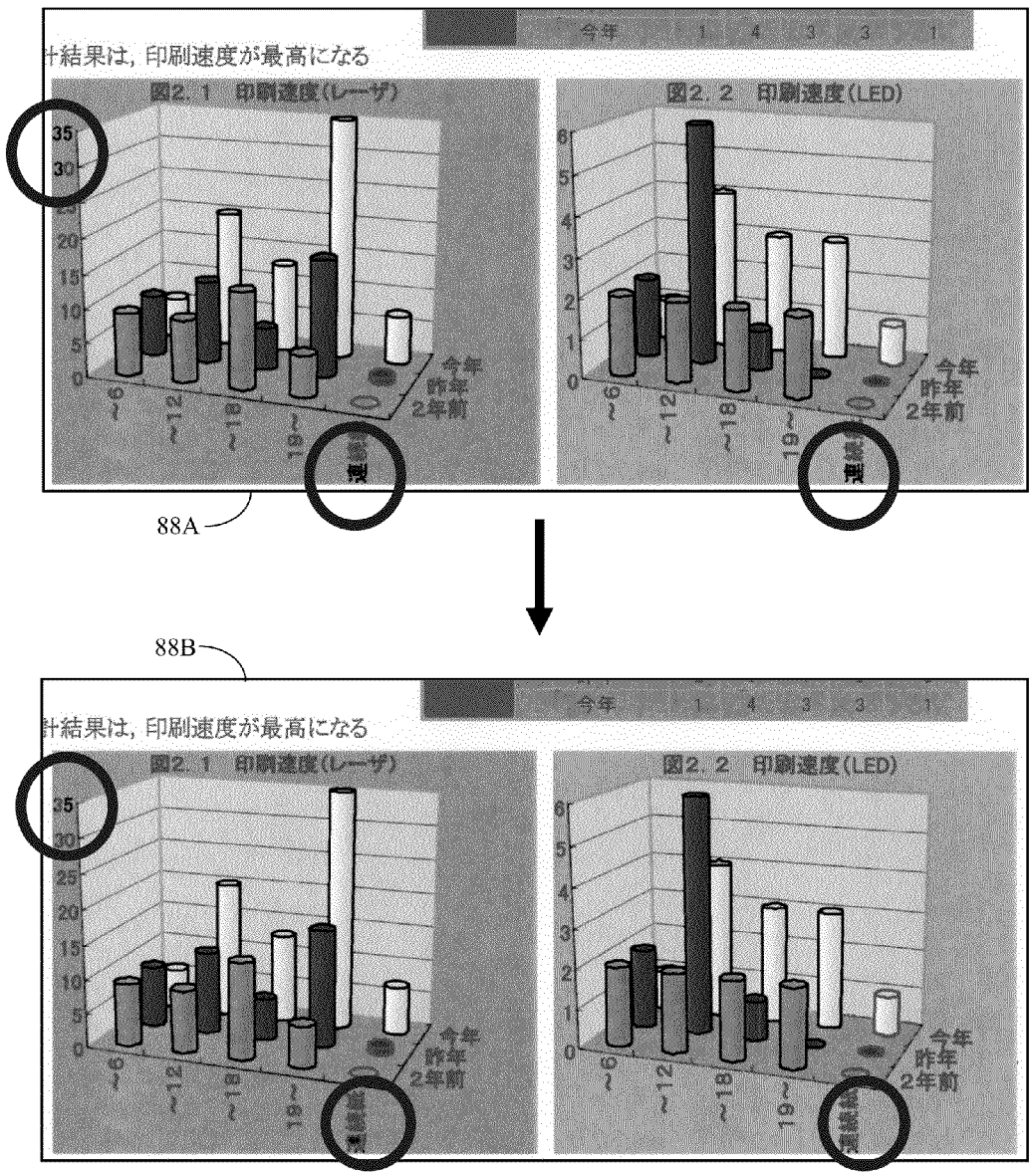
Figure 12C:
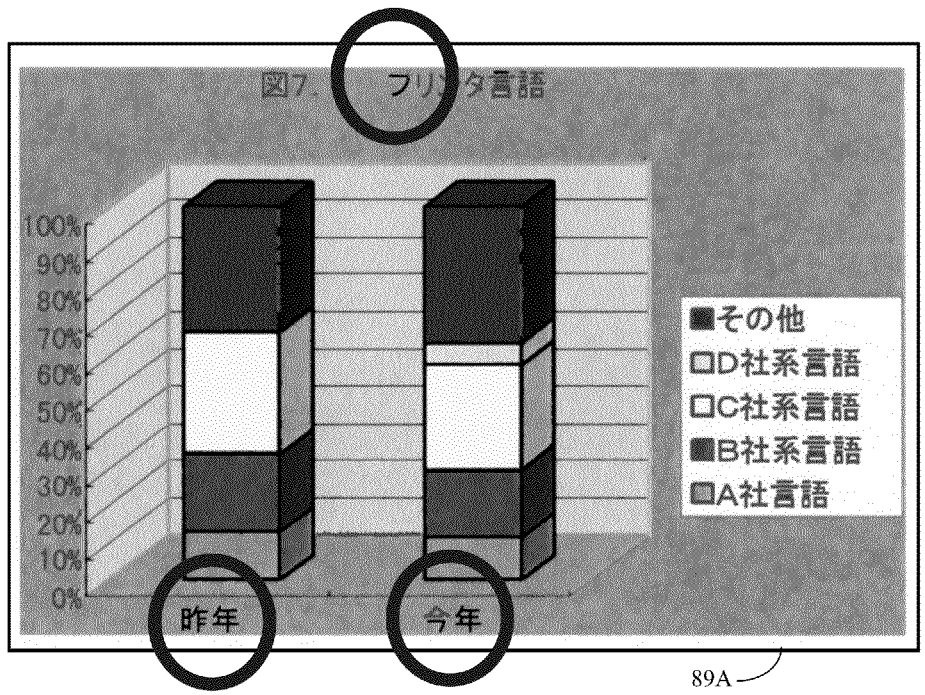
Figure 12C:
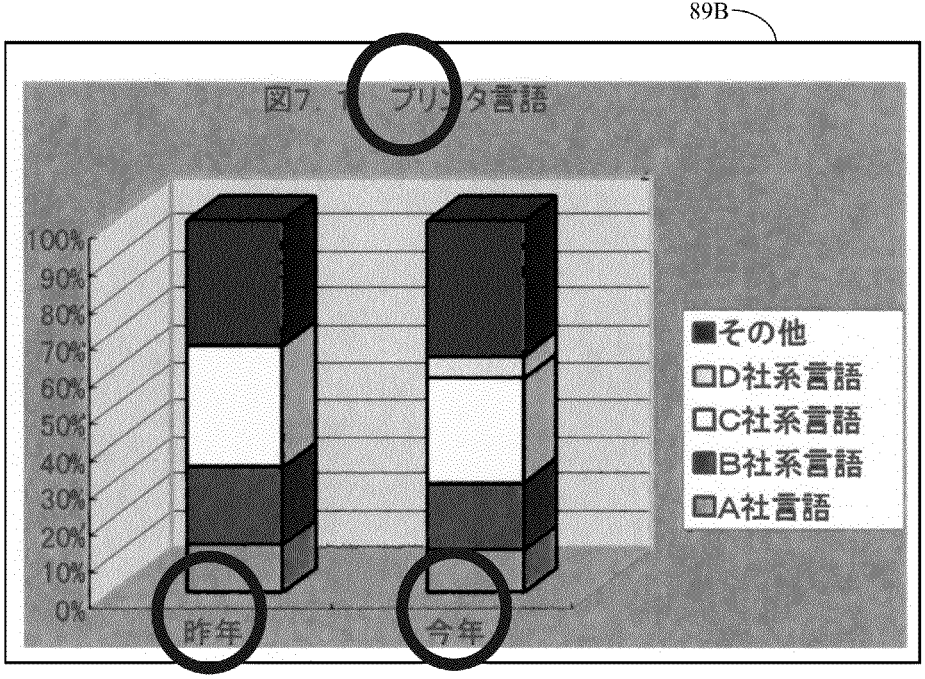

Finally, the present invention was applied to the image regions of FIGS. 2B, 2C and 2D, re-illustrated as image regions 87A, 88A and 89A in FIGS. 12A, 12B and 12C, respectively. As shown in FIGS. 12A, 12B, and 12C, the misclassified components of image regions 87A, 88A and 89A, shown encircled, are correctly reclassified as text components (also shown encircled) in corresponding corrected image regions 87B, 88B, and 89B.

Figure 13:
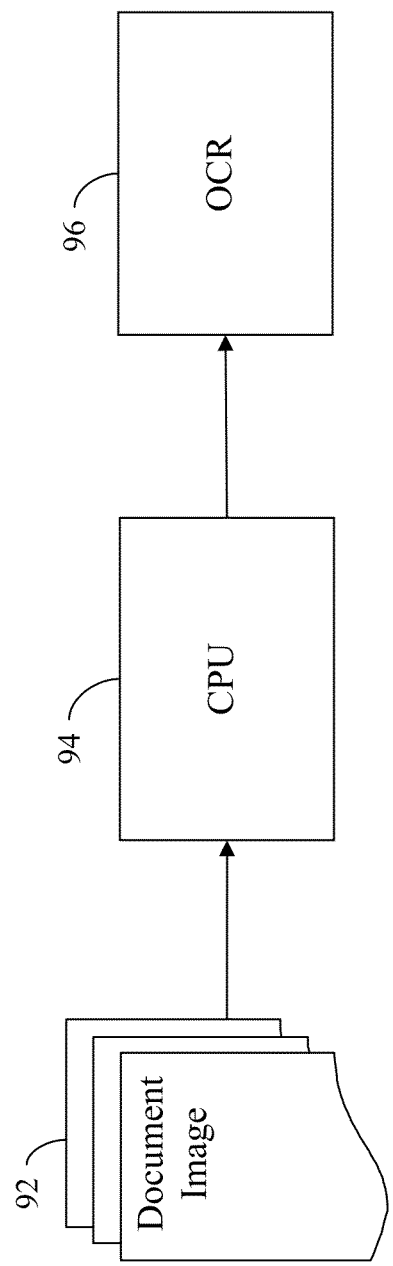
FIG. 13 illustrates a processing device implementing the present invention.

It is to be understood that all of the above may be implementing a microcomputer, data processing device, data processor, or other (electronic) computing device/machine. For example in FIG. 13, a document image 92 may be applied to a CPU 94, which may be part of a microcomputer. CPU 94 would then apply the method of the present invention, such as described in the flowcharts of FIGS. 6 and 7 to reclassify some non-text pixels are text pixels. The results of this reclassification can then be submitted to an optical character recognition (OCR) module 96, which then attempts to identify the human readable, printable characters represented by the text pixels in the reclassified document image.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of reclassifying non-text pixels within a document image, comprising the following steps:
 (a) accessing said document image, said document image having foreground pixels identified, wherein said identified foreground pixels that have been deemed to be part of human readable printable characters are classified as text pixels and said identified foreground pixels that have been deemed not to be part of human readable printable characters are classified as said non-text pixels, and connected components of classified text pixels are defined as text components and connected components of classified non-text pixels are defined as non-text components;
 (b) submitting each non-text component within said document image to a candidate selection process wherein each non-text component that is deemed to potentially include text content is designated a candidate component; and
 (c) submitting each designated candidate component to a reclassification process wherein foreground pixels that form a specific geometric shape are removed from the designated candidate component, and the connected components defined by any remaining foreground pixels are reclassified as text components;
 wherein in step (c), said specific geometric shape is also of minimum size, said minimum size being defined relative to the dimensions of the bounding box of the designated candidate component being processed, and only foreground pixels that form the specific geometric shape and are not smaller than said minimum size are removed from the designated candidate component;
 wherein said geometric shape is a straight line of foreground pixels, and said minimum size is a variable minimum size defined as a predefined percentage of the length of a corresponding side of the bounding box; and
 wherein said corresponding side of the bounding box for a given straight line of foreground pixels is determined by projecting the straight line to the side dimensions of the bounding box and the side dimension that receives the longest projection is deemed said corresponding side of the bounding box.

2. The method of claim 1, wherein straight lines of foreground pixels are identified using Hough Transforms.

3. The method of claim 1, wherein said predefined percentage is 60%.

4. The method of claim 1, wherein step (c) includes:
   (i) identifying as target lines any straight lines of foreground pixels within the candidate component whose length is at least said predefined percentage of the length of the corresponding side of the bounding box;
   (ii) removing all identified target lines; and
   (iii) collecting into new non-text components any remaining foreground pixels within the candidate component's bounding box; and
   (iv) reclassifying as text-components the new non-text components.

5. A method of reclassifying non-text pixels within a document image, comprising the following steps:
   (a) accessing said document image, said document image having foreground pixels identified, wherein said identified foreground pixels that have been deemed to be part of human readable printable characters are classified as text pixels and said identified foreground pixels that have been deemed not to be part of human readable printable characters are classified as said non-text pixels, and connected components of classified text pixels are defined as text components and connected components of classified non-text pixels are defined as non-text components;
   (b) submitting each non-text component within said document image to a candidate selection process wherein each non-text component that is deemed to potentially include text content is designated a candidate component; and
   (c) submitting each designated candidate component to a reclassification process wherein foreground pixels that form a specific geometric shape are removed from the designated candidate component, and the connected components defined by any remaining foreground pixels are reclassified as text components;
   wherein in step (b), said candidate selection process includes:
   (A) selecting for possible reclassification a current non-text component from said document image, wherein the selected current non-text component is a non-text component that has not previously been selected for possible reclassification;
   (B) defining a bounding box of the current non-text component;
   (C) IF a set of geometric properties of said bounding box is not greater than predefined minimums determined relative to the same geometric properties of the document image, THEN proceeding to step (F);
   (D) IF a measure of foreground pixel density of the bounding box does not meet a predefined density criterion, THEN proceeding to step (F);
   (E) IF more than 50% of the foreground pixels that are part of the bounding box lie in straight lines, THEN the current non-text component is designated a candidate component; and
   (F) IF all non-text components within the document image have not yet been selected for possible reclassification, then returning to step (A).

6. The method of claim 5, wherein in step (C), said set of geometric properties includes a first sub-set including determining if the length of the bounding box is at least a first predefined percentage of the length of the document image and the width of the bounding box is at least a second predefined percentage of the width of the document image.

7. The method of claim 6, wherein in step (C), said set of geometric properties includes a second sub-set including determining if the area of the bounding box is at least a third predefined percentage of the area of the document image, and said method proceeds to step (F) only if neither of said first sub-set nor said second sub-set of conditions are met.

8. The method of claim 7, wherein said first predefined percentage is 10%, said second predefined percentage is 10%, and said third predefined percentage is 10%.

9. The method of claim 5, wherein in step (D), said measure of foreground pixel density is a measure of the foreground pixel density of the perimeter of the bounding box; and said predefined density criterion is defined as the foreground pixel density of the perimeter of the bounding box being greater than 80%.

10. The method of claim 5, wherein in step (D), said measure of foreground pixel density is a measure of the foreground pixel density within the bounding box; and said predefined density criterion is defined as the foreground pixel density within the bounding box being less than 10%.

11. The method of claim 5, wherein in step (D):
   said measure of foreground pixel density is a measure of the foreground pixel density of the perimeter of the bounding box OR is a measure of the foreground pixel density within the bounding box; and
   said predefined density criterion is met if either the foreground pixel density of the perimeter of the bounding box is greater than 80% or if the foreground pixel density within the bounding box being less than 10%.

12. A processing device implementing the method of claim 1.

13. An electronic computing device for reclassifying non-text pixels within a document image, comprising:
   an input for accessing said document image, said document image having foreground pixels identified, wherein said identified foreground pixels that have been deemed to be part of human readable printable characters are classified as text pixels and said identified foreground pixels that have been deemed not to be part of human readable printable characters are classified as said non-text pixels, and connected components of said text pixels are defined as text components and connected components of said non-text pixels are defined as non-text components;
   a data processor that:
   submits each defined non-text component within said document image to a candidate selection process wherein each defined non-text component that is deemed to potentially include text content is designated a candidate component; and
   submits each designated candidate component to a reclassification process wherein foreground pixels that form a specific geometric shape are removed from the designated candidate component, and the connected components defined by any remaining foreground pixels are reclassified as text components;
   wherein said specific geometric shape is a straight line of foreground pixels of minimum length, said minimum length being defined as a predefined percentage of the length of a corresponding side of a bounding box of the designated candidate component being processed, and only foreground pixels that fort lines not smaller than said minimum length are removed from the designated candidate component being processed; and
   wherein said reclassification process includes:
   (i) identifying as target, lines any straight, lines of foreground pixels within the candidate component whose length is at least said minimum length;
   (ii) removing all identified target lines; and (iii) collecting into new non-text components any remaining foreground pixels within the candidate component's bounding box; and (iv) reclassifying as text-components the new non-text components.

14. The electronic computing device of claim 13, wherein straight lines of foreground pixels are identified using Hough Transforms, and said predefined percentage is 60%.

15. The electronic computing device of claim 13, wherein said candidate selection process includes:

(A) selecting for possible reclassification a current non-text component from said document image, wherein the selected current non-text component is a non-text component that has not previously been selected for possible reclassification;

(B) defining a bounding box of the current non-text component;

(C) IF (the length of the bounding box is not smaller than a first predefined percentage of the length of the document image AND the width of the bounding box is not smaller than a second predefined percentage of the width of the document image) OR (the area of the bounding box is not smaller than a third predefined percentage of the area of the document image) THEN proceeding to step (D), ELSE proceeding to step (F);

(D) IF (the foreground pixel density of the perimeter of the bounding box is not smaller than a fourth predefined percentage) OR (the foreground pixel density within the bounding box is not greater than a fifth predefined percentage), THEN proceeding to step (E), ELSE proceeding to step (F);

(E) IF more than 50% of the foreground pixels that are part of the bounding box lie in straight lines, THEN the current non-text component is designated a candidate component; and (F) IF all non-text components within the document image have not yet been selected for possible reclassification, then returning to step (A).

16. The electronic computing device of claim 15 wherein said first predefined percentage is 10%, said second predefined percentage is 10%, said third predefined percentage is 10%, said fourth predefined percentage 80%, and said fifth predefined percentage 10%.

* * * * *